(12) United States Patent
Kato et al.

(10) Patent No.: US 11,987,122 B2
(45) Date of Patent: May 21, 2024

(54) DISPLAY CONTROL DEVICE, DISPLAY SYSTEM, AND DISPLAY CONTROL METHOD FOR CONTROLLING DISPLAY OF ALERT

(71) Applicant: Panasonic Intellectual Property Management Co., Ltd., Osaka (JP)

(72) Inventors: Masataka Kato, Kanagawa (JP); Koichi Emura, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 37 days.

(21) Appl. No.: 17/847,738

(22) Filed: Jun. 23, 2022

(65) Prior Publication Data

US 2022/0324328 A1    Oct. 13, 2022

Related U.S. Application Data

(63) Continuation of application No. PCT/JP2020/048739, filed on Dec. 25, 2020.

(30) Foreign Application Priority Data

Dec. 26, 2019   (JP) .................................. 2019-235908

(51) Int. Cl.
*B60K 35/00*    (2006.01)
*B60K 35/22*    (2024.01)
(Continued)

(52) U.S. Cl.
CPC ................ *B60K 35/00* (2013.01); *G06F 3/14* (2013.01); *G06V 10/761* (2022.01); *G06V 20/58* (2022.01);
(Continued)

(58) Field of Classification Search
None
See application file for complete search history.

(56) References Cited

U.S. PATENT DOCUMENTS 10,272,780 B2    4/2019   Yoshida et al.
2016/0082840 A1   3/2016   Yoshida et al.
(Continued)

FOREIGN PATENT DOCUMENTS

JP    2007-280151    10/2007
JP    2017-049666    3/2017
(Continued)

OTHER PUBLICATIONS

International Search Report (ISR) from International Searching Authority (Japan Patent Office) in International Pat. Appl. No. PCT/JP2020/048739, dated Feb. 16, 2021, together with an English language translation.

(Continued)

*Primary Examiner* — Yingchun He
(74) *Attorney, Agent, or Firm* — Greenblum & Bernstein, P.L.C.

(57) ABSTRACT

An input unit receives a first image that captures a scene in front of a vehicle or a scene in front of a user on board a vehicle at a first point of time. A generator generates a third image showing a result of prediction of the scene in front at the first point of time, based on a second image that captures the scene in front at a second point of time preceding the first point of time. A display controller controls display of information presentation based on a result of comparison between the first image received by the input unit and the third image generated by the generator using a predetermined criterion.

11 Claims, 28 Drawing Sheets

(51) Int. Cl.
  *B60K 35/28*   (2024.01)
  *G06F 3/14*   (2006.01)
  *G06V 10/74*   (2022.01)
  *G06V 20/58*   (2022.01)
  *G06V 20/59*   (2022.01)
  *G08G 1/16*   (2006.01)

(52) U.S. Cl.
  CPC ............... *G06V 20/59* (2022.01); *G08G 1/16* (2013.01); *B60K 35/22* (2024.01); *B60K 35/28* (2024.01); *B60K 2360/16* (2024.01)

(56) References Cited

U.S. PATENT DOCUMENTS

| | | | |
|---|---|---|---|
| 2016/0335508 A1* | 11/2016 | Gor | G06V 20/588 |
| 2017/0084176 A1* | 3/2017 | Nakamura | B60K 35/00 |
| 2018/0247140 A1* | 8/2018 | Tokita | G06T 7/246 |
| 2018/0334108 A1* | 11/2018 | Rötzer | G03B 37/04 |
| 2019/0221004 A1 | 7/2019 | Tokita | |
| 2019/0332939 A1 | 10/2019 | Alletto et al. | |
| 2019/0340496 A1 | 11/2019 | Kim et al. | |
| 2020/0003917 A1 | 1/2020 | Maeda | |
| 2020/0005644 A1* | 1/2020 | Ichimaru | G08G 1/096775 |

FOREIGN PATENT DOCUMENTS

| | | |
|---|---|---|
| JP | 2017049666 A * | 3/2017 |
| JP | 2018-125639 | 8/2018 |
| JP | 2018-156640 | 10/2018 |
| JP | 2018-173944 | 11/2018 |
| JP | 2019-087057 | 6/2019 |
| WO | 2015/037117 | 3/2015 |
| WO | WO2015/037117 | 3/2017 |

OTHER PUBLICATIONS

Kondoh et al., "Identification of Visual Cues and Quantification of Drivers' Perception of Proximity Risk to the Lead Vehicle in Car-Following Situations," Journal of Mechanical Systems for Transportation and Logistics, vol. 1, No. 2, pp. 170-180, 2008.

* cited by examiner

1000

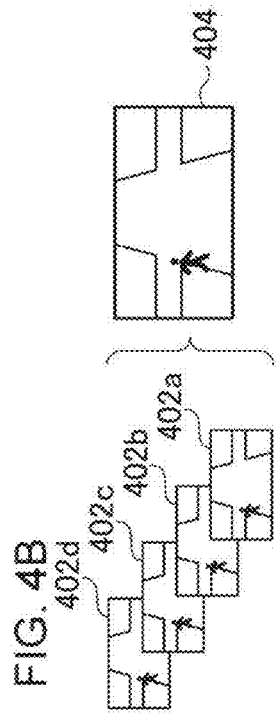
FIG. 4A
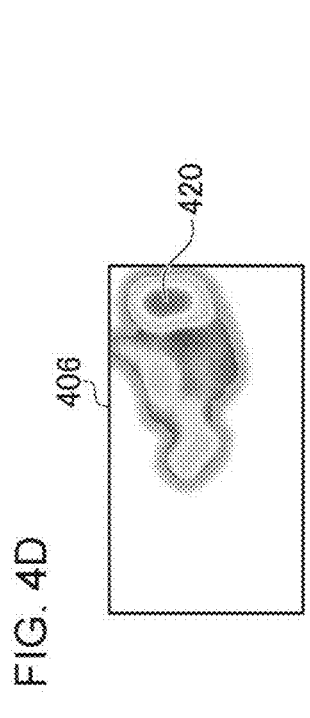
FIG. 4C
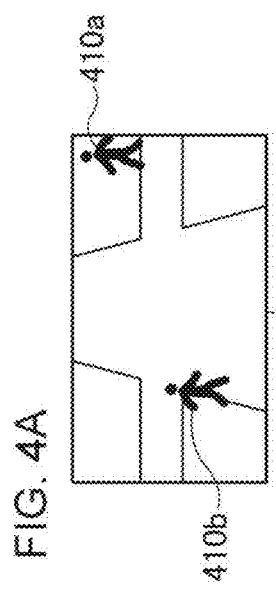
FIG. 4B
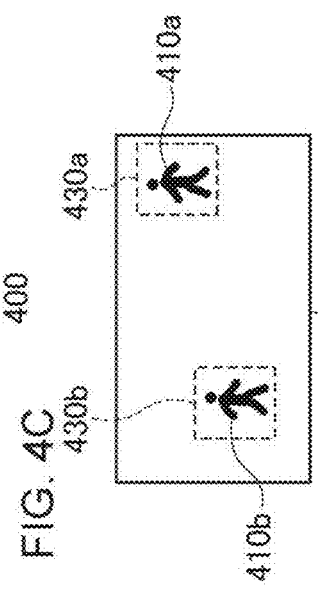
FIG. 4D
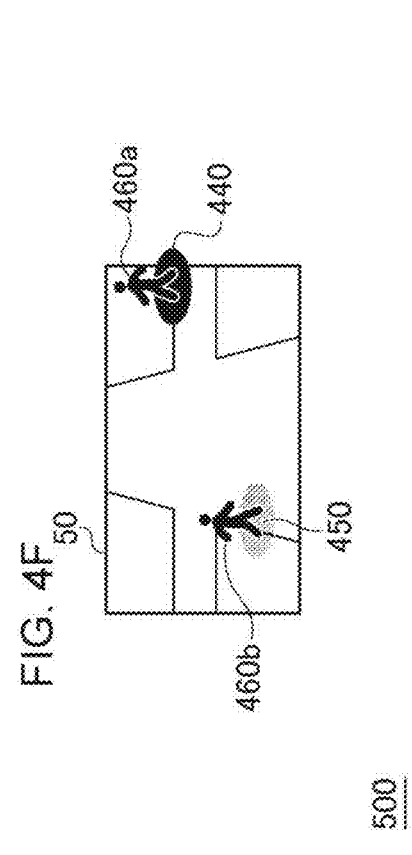
FIG. 4E
FIG. 4F FIG. 10A
| PREDICTION ERROR | | |
|---|---|---|
| LOW | MEDIUM | HIGH |
|  |  |  |
260
FIG. 10B
FIG. 10C
410
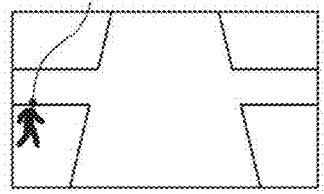
FIG. 10D
410
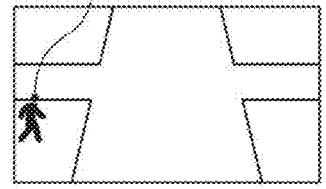
FIG. 10E
50
FIG. 10F
460    50
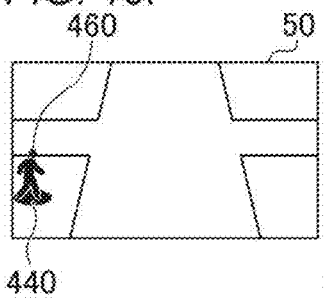
440
FIG. 10G
460    50
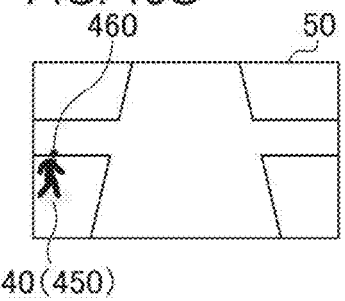
440(450)
500

FIG. 13A
|  |  | PREDICTION ERROR | | |
|---|---|---|---|---|
|  |  | LOW | MEDIUM | HIGH |
| TTC | LONG |  |  |  |
|  | MEDIUM |  |  |  |
|  | SHORT |  |  |  |
260
FIG. 13B
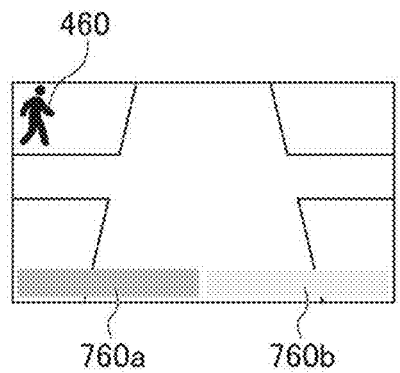
FIG. 13C
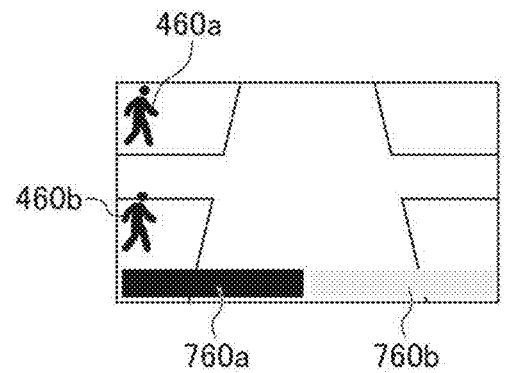
500

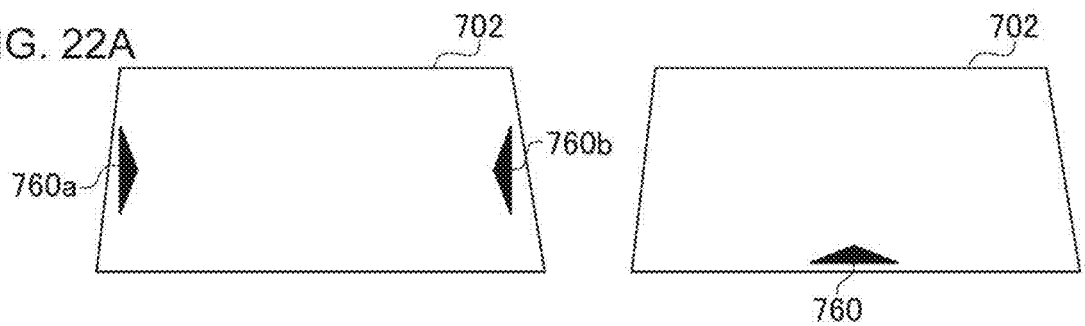
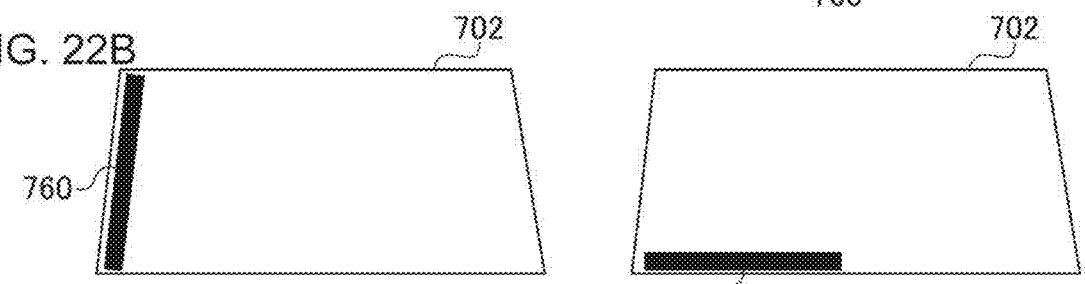
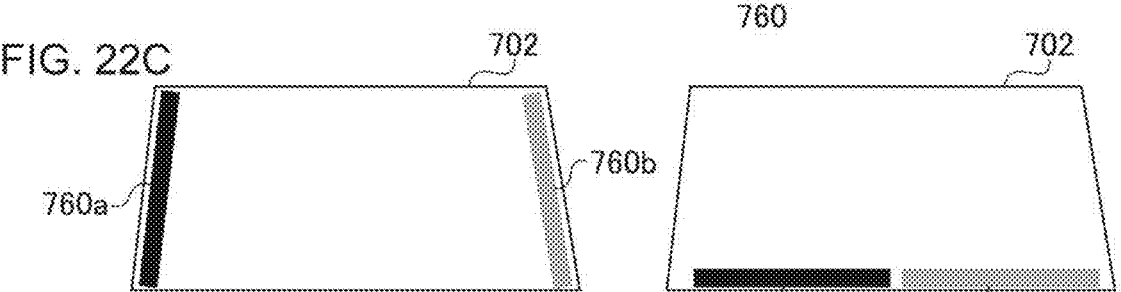
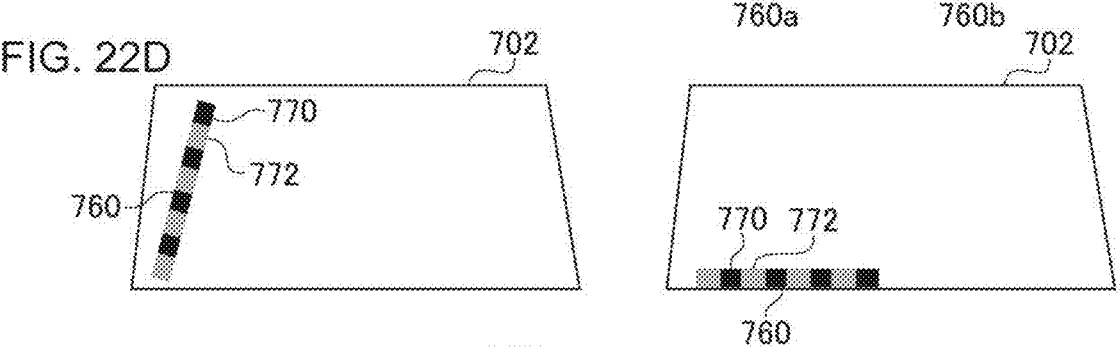
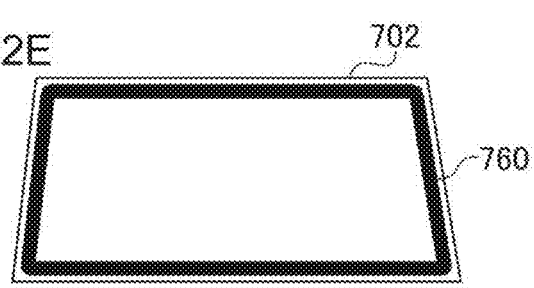

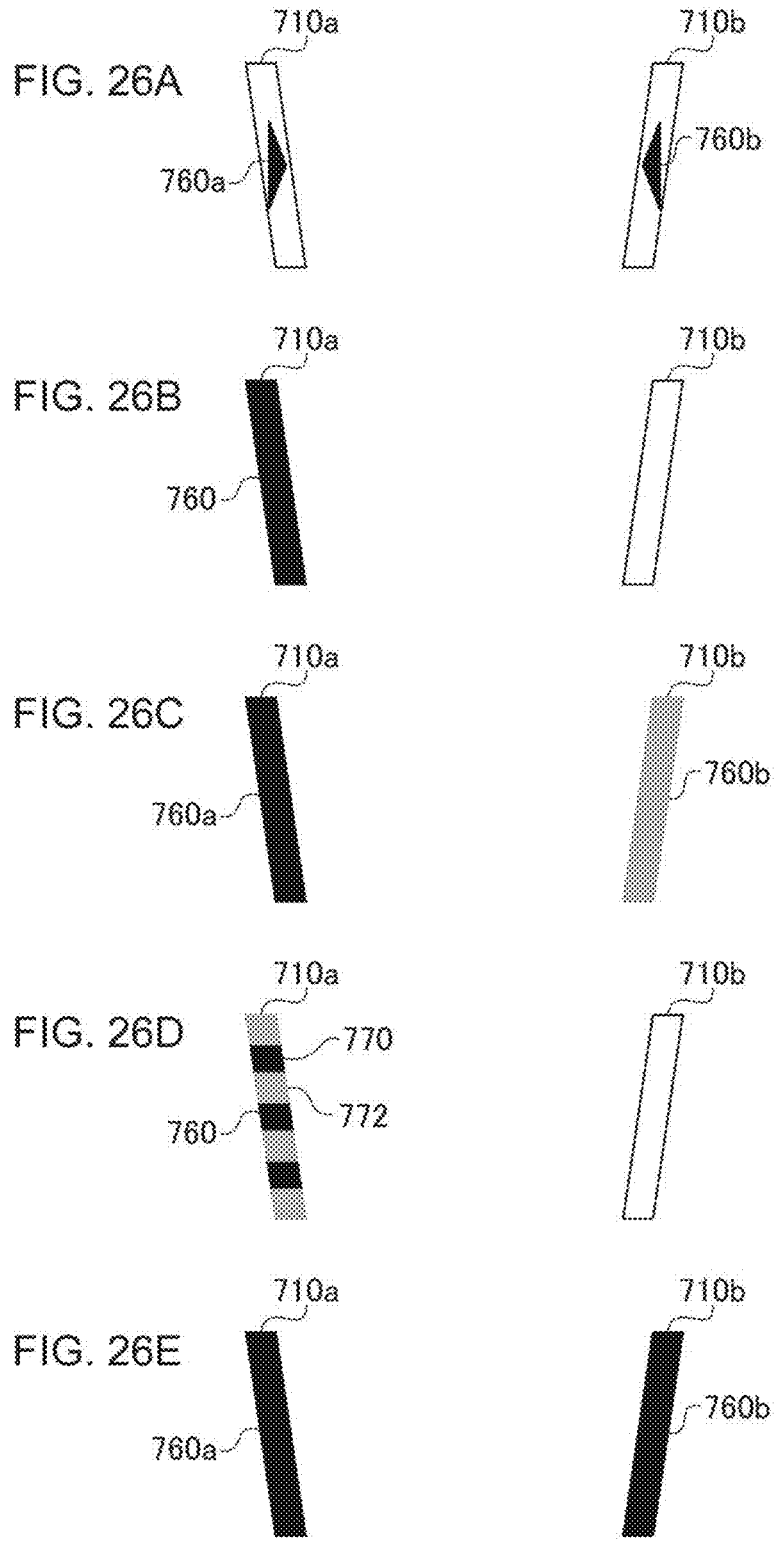

TTC (Time To Collision)    $t_{TTC} = \dfrac{d}{Vo - Ve}$

THW (Time HeadWay)    $t_{THW} = \dfrac{d}{Ve}$

DRIVER'S SUBJECTIVE RISK INDEX
Zone A       : THW
Zone A~B : Risk Perception
Zone C~D : TTC $Risk\ Perception = \dfrac{A}{t_{THW}} + \dfrac{B}{t_{TTC}}$

DISPLAY CONTROL DEVICE, DISPLAY SYSTEM, AND DISPLAY CONTROL METHOD FOR CONTROLLING DISPLAY OF ALERT

1. FIELD

The present disclosure relates to a display control technology and, more particularly, to a display control device, a display control system, and a display control method for controlling the display of an alert.

2. DESCRIPTION OF THE RELATED ART

It is considered that the characteristics of prediction made by human beings (e.g., preconception) affect causes of traffic accidents. This leads to a novel approach that simulates how visual perception of a person driving a vehicle predicts the environment for driving, by using a deep predictive coding network (PredNet), a deep learning machine incorporating a predictive coding theory (one of credible principles that explain how the human cerebral cortex works). The approach can be applied to prediction of a risk situation in automatic driving. When the first data included in the time series data is input to the PredNet, the first prediction data for a point of time after an elapse of the first time is predicted. The time series data also includes the second data for a point of time after an elapse of the first time since the first data. A large error between the second data and the first prediction data may mean that an incident beyond the imagination of the driver is occurring (see, for example, patent literature 1).

It is also proposed to alert the driver by displaying an icon associated with a detected pedestrian, by using a head-up display (HUD) mounted on a vehicle.

[Patent Literature 1] JP2018-173944

According to the related art, however, the user may feel annoyed because an alert is originated regardless of the perception by a person or lack thereof.

SUMMARY

The present disclosure addresses this issue and a purpose thereof is to provide a technology of identifying a scene or an object that is difficult for human beings to perceive and providing information accordingly.

A display control device according to an embodiment of the present disclosure includes: an input unit that receives a first image that captures a scene in front of a vehicle or a scene in front of a user on board a vehicle at a first point of time; a generator that generates a third image showing a result of prediction of the scene in front at the first point of time, based on a second image that captures the scene in front at a second point of time preceding the first point of time; and a display controller that controls information presentation based on a result of comparison between the first image and the third image using a predetermined criterion.

Another embodiment of the present disclosure relates to a display system. The display system includes: an imaging device; and a display control device connected to the imaging device. The display control device includes: an input unit that receives a first image that captures a scene in front of a vehicle or a scene in front of a user on board a vehicle at a first point of time; a generator that generates a third image showing a result of prediction of the scene in front at the first point of time, based on a second image that captures the scene in front at a second point of time preceding the first point of time; and a display controller that controls information presentation based on a result of comparison between the first image and the third image using a predetermined criterion.

Another embodiment of the present disclosure relates to a display control method. The method includes: receiving a first image that captures a scene in front of a vehicle or a scene in front of a user on board a vehicle at a first point of time; generating a third image showing a result of prediction of the scene in front at the first point of time, based on a second image that captures the scene in front at a second point of time preceding the first point of time; and controlling information presentation based on a result of comparison between the first image and the third image using a predetermined criterion.

Optional combinations of the aforementioned constituting elements, and implementations of the present disclosure in the form of devices, systems, methods, programs, recording mediums having programs recorded thereon, and vehicles carrying the device may also be practiced as additional modes of the present disclosure.

BRIEF DESCRIPTION OF DRAWINGS

FIGS. 4A-4F show an outline of the process in the display system of FIG. 3;

FIGS. 10A-10G show an outline of the operation of the display system according to embodiment 3;

FIGS. 13A-13C show an outline of the operation of the display system according to embodiment 4;

FIGS. 22A-22E show an outline of display on the HUD according to embodiment 7;

FIGS. 26A-26E show an outline of display on the pillar display according to embodiment 7;

DETAILED DESCRIPTION

The invention will now be described by reference to the preferred embodiments. This does not intend to limit the scope of the present invention, but to exemplify the invention.

Embodiment 1

A brief summary will be given before describing the present disclosure in specific details. The embodiment relates to a display system mounted on a vehicle. The display system includes an imaging device capable of capturing an image of a scene in front of a vehicle and a display control device for controlling the display on a HUD. The display control device senses an object such as a pedestrian from a video captured by the imaging device and causes the HUD to display an image for alerting of the object (hereinafter, referred to as "information presenting image"). The HUD displays information such as an information presenting image on the front window of the vehicle and so is capable of displaying an image at a position closer to the direction of view from the driver than, for example, a monitor of a car navigation device provided in the vehicle. For this reason, the driver driving the vehicle can notice the display immediately or can see the display with less movement of line of sight.

When the number of information presenting images displayed on the HUD increases, it will be difficult to see the scene in front beyond the HUD, which annoys the driver. Further, if an information presenting image is displayed for an object that the driver has already perceived, it will be meaningless for the driver. Selecting only one of a plurality of objects (e.g., the object closest to the vehicle) and displaying an information presenting image accordingly may easily result in an object being overlooked. For this reason, it is required to alert the user to reduce the occurrence of oversight, while also reducing the annoyance from the display.

The display control device according to this embodiment displays an information presenting image for an object for which a large prediction error occurs. A prediction error is defined by a difference between an actual scene in front and a scene in front predicted from a past scene in front. It can be said that the larger the prediction error, the larger the likelihood of oversight by the driver. In other words, by causing an object that is likely to be overlooked to be displayed preferentially, the display that is not easily overlooked and is not annoying can be realized. Embodiments of the present disclosure will now be described in detail with reference to the drawings. The embodiments described below are by way of examples only, and the present disclosure is not limited by these embodiments.

Figure 1:
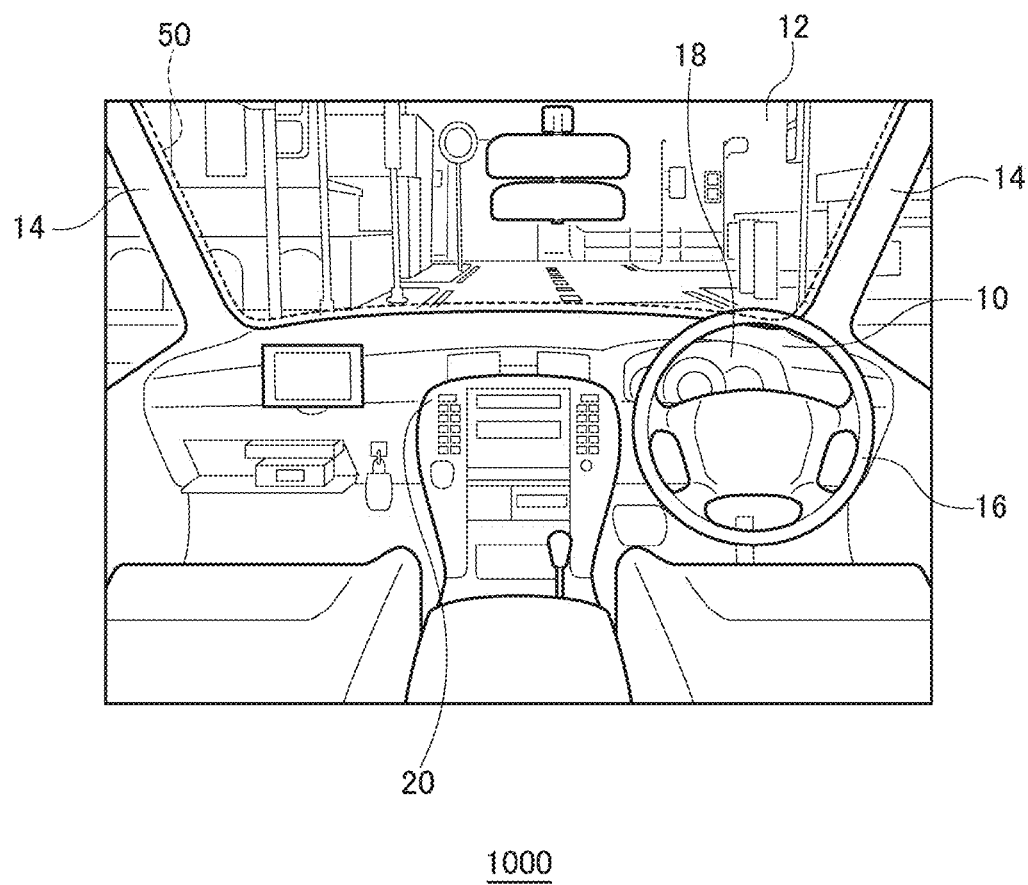
FIG. 1 schematically shows the interior of a vehicle according to embodiment 1.

FIG. 1 schematically shows the interior of a vehicle 1000 and shows a view of the vehicle interior of the vehicle 1000 seen from behind. A dashboard 10 extending horizontally is provided toward the front of the vehicle interior, a front window 12 is provided above the dashboard 10, and pillars 14 extend from the dashboard 10 on the left and right of the front window 12. A steering 16 is provided to the right of the dashboard 10, and a meter 18 is provided in the dashboard 10 in front of the steering 16. The steering 16 may be provided to the left of the dashboard 10. A center console 20 is provided in the center of the dashboard 10.

A display device (not shown) is provided in the dashboard 10 on the side of the steering 16. The display device is a HUD and projects a display light to a portion of a display-enabled area 50 of the front window 12. The display-enabled area 50 is provided in the front window 12 and in front of the driver's seat. The display-enabled area 50 has a horizontally elongated rectangular shape fitted to the shape of the front window 12. The display light projected by the display-enabled area 50 toward the vehicle interior is viewed by the driver. The driver can also view the scene in front of the vehicle 1000 via the front window 12 and so can view a virtual image of the image projected by the display device as being superimposed on the scene in front. FIG. 1 shows that the display device does not display an image in the display in the display-enabled area 50.

Figure 2:
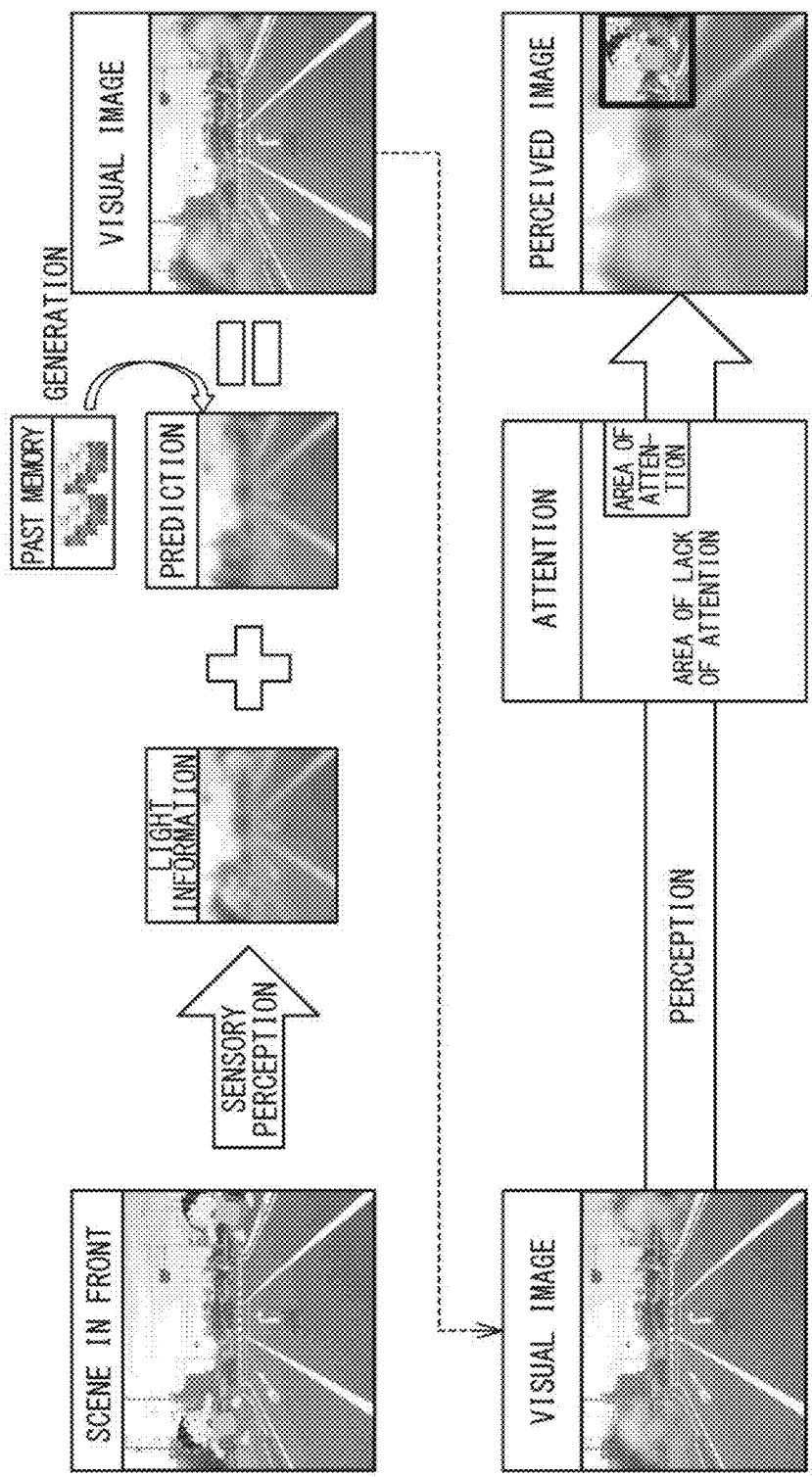
FIG. 2 shows an outline of how the driver of the vehicle of FIG. 1 perceives a scene in front.

FIG. 2 shows an outline of how the driver of the vehicle 1000 perceives a scene in front. The driver sees a scene in front. The driver perceives light information on the scene in front because perception of the whole of the scene in front takes time. Further, the driver predicts a current scene in front from a past memory of a scene in front in in order to compensate for the light information. The driver generates a visual image by combining the light information perceived with the current scene in front as predicted. The driver narrows down the information that should be perceived to an area of interest because perception of the whole of the visual image takes time. The area of interest is set by, for example, the experience of the driver, etc. Consequently, the driver perceives a pedestrian stepping in from right. Thus, the driver makes perception efficient by putting "prediction" and "attention" into work.

Figure 3:
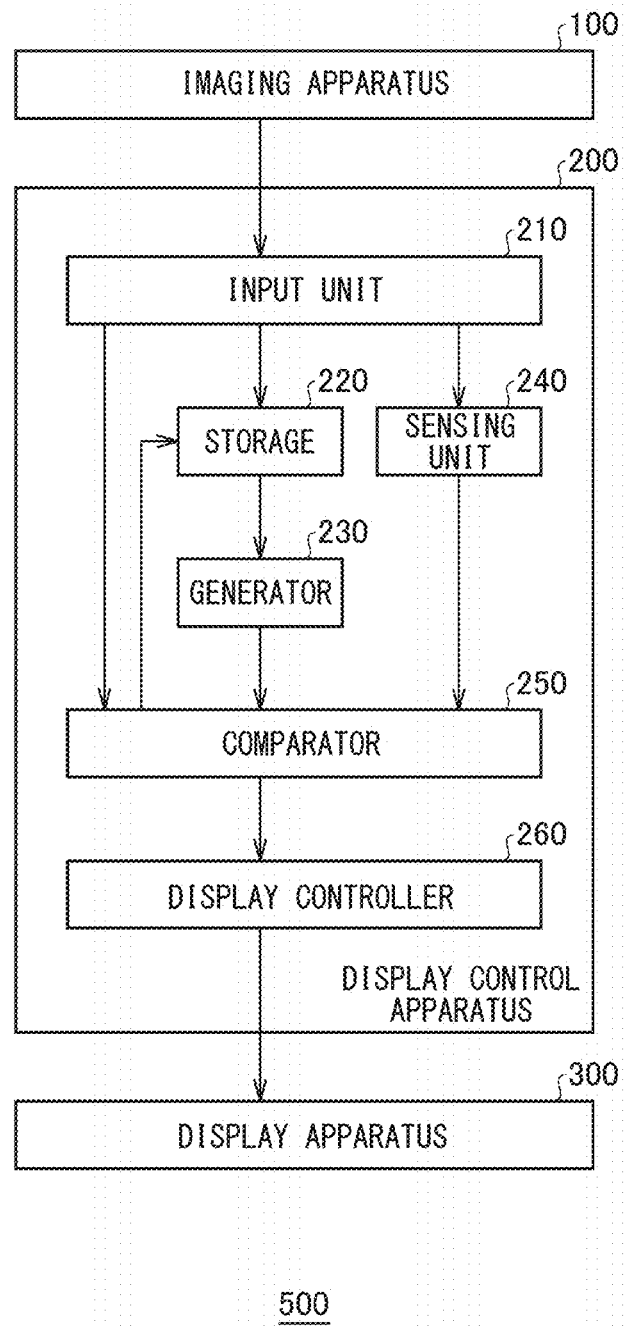
FIG. 3 shows a configuration of a display system mounted on the vehicle of FIG. 1.

FIG. 3 shows a configuration of a display system 500 mounted on the vehicle 1000. The display system 500 includes an imaging device 100, a display control device 200, and a display device 300. The display control device 200 includes an input unit 210, a storage 220, a generator 230, a sensing unit 240, a comparator 250, and a display controller 260. The imaging device 100 and the display control device 200 are connected by a vehicle-mounted network such as a controller area network (CAN).

The imaging device 100 is provided in, for example, the frontal part of the vehicle 1000 and captures a video of a scene in front of the vehicle 1000. The scene thus captured corresponds to a scene in front of the vehicle 1000 that the driver can view through the front window 12. The video captured by the imaging device 100 is comprised of a plurality of images arranged in the time sequence. The imaging device 100 transmits the captured video to the display control device 200.

The input unit 210 of the display control device 200 receives a video from the imaging device 100. The latest of the plurality of images included in the video is the image at the current point of time, and an image arranged before the image at the current point of time is a past image. For example, the image at the current point of time can be said to be the "first image" capturing a scene in front at the first point of time (current point of time), and the past image can be said to be the "second image" capturing a scene in front at the second point of time preceding the first point of time. Generally, a video (moving images) includes a plurality of second images (a sequence of frame images) captured at different second points of time. In the following description, the term "second image" may refer to a single image or generically refer to a plurality of images.

FIGS. 4A-4F show an outline of the process in the display system 500. FIG. 4A shows a captured image 400 input to the input unit 210. The captured image 400 corresponds to the image at the current point of time, i.e., the first image. By way of one example, two pedestrians are illustrated as a first object 410a and a second object 410b. FIGS. 4B-4F will be described later, and reference is made back to FIG. 3. The input unit 210 outputs a plurality of images to the storage 220, the sensing unit 240, and the comparator 250.

The storage 220 receives the plurality of images from the input unit 210. The storage 220 stores the plurality of images for a certain period of time and then outputs the images to the generator 230. It can therefore be said that the storage 220 delays the plurality of images. The generator 230 receives the plurality of images from the storage 220. The generator 230 is provided with a neural network such as a PredNet and deep learning network. An image that predicts a scene in front at the first point of time (hereinafter, "a third image") is generated by inputting a plurality of second images to the neural network.

The third image is an image that predicts the first point of time concurrent with the first image from the second image captured at the second point of time. A publicly known technology may be used in the neural network, and a description thereof will be omitted. Alternatively, the generator 230 may generate the third image by using image processing technology such as optical flow analysis instead of a neural network. For example, the generator 230 may predict the first point of time concurrent with the first image from the second image captured at the second point of time by using optical flow analysis and generate the third image based on the result of prediction. A publicly known technology may be used in optical flow analysis, and a description thereof will be omitted.

FIG. 4B shows an outline of the process in the generator 230. A first past image 402a through a fourth past image 402d, which are generically referred to as past images 402, are images captured at mutually different points of time and correspond to the plurality of second images at different second points of time. A prediction image 404 is an image predicted from a plurality of past images 402 and corresponds to the third image predicting the first point of time. In this case, one prediction image 404 is generated from four past images 402, but the number of past images 402 that should be used to generate one prediction image 404 is not limited to "4". FIGS. 4C-4F will be described later, and reference is made back to FIG. 3. The generator 230 outputs the third image thus generated to the comparator 250.

The sensing unit 240 receives a plurality of images from the input unit 210. The sensing unit 240 senses an object 410 included in the first image by subjecting the first image, of the plurality of images, to an image recognition process (object recognition, etc.) such as pattern matching. A publicly known technology may be used in the image recognition process, and a description thereof will be omitted. The sensing unit 240 sets an area (hereinafter, referred to as "object placement area") that encircles the object 410 thus sensed in the first image. FIG. 4C shows an outline of the process in the sensing unit 240. The captured image 400, the first object 410a, and the second object 410b are the same as those shown in FIG. 4A. When the sensing unit 240 senses the first object 410a and the second object 410b from the captured image 400, the sensing unit 240 sets a first object placement area 430a to encircle the first object 410a and a second object placement area 430b to encircle the second object 410b. FIGS. 4D-4F will be described later, and reference is made back to FIG. 3. The sensing unit 240 outputs position information on the object placement area 430 thus set to the comparator 250. The sensing unit 240 may output the position information on the sensed object 410 to the comparator 250.

The comparator 250 receives a plurality of images, and, in particular, the first image, from the input unit 210, receives the third image from the generator 230, and receives the position information on the object placement area 430 from the sensing unit 240. The comparator 250 generates an image (hereinafter, referred to as "comparison image") showing a difference between the first image and the third image by calculating the difference in units of pixels. When there is an area in the comparison image in which the difference is larger than a predetermined threshold value, the comparator 250 identifies that area (hereinafter, referred to as "difference area"). A difference area could an area in which the difference between the first image and the third image is larger than the predetermined threshold value, namely, an area in which the prediction error is large. Further, the comparator 250 compares the position information on the difference area with the position information on the object placement area 430 and identifies an area in which they overlap (hereinafter, referred to as "overlapping area"). Identification of an overlapping area is equivalent to identifying an area in the difference area in which the first image includes the object 410, i.e., associating an area having a large prediction error with an area in which the object 410 is sensed.

FIG. 4D shows an outline of the process in the comparator 250. A difference area 420 in a comparison area 406 is shown. In the example shown in FIG. 4D, the difference area 420 overlaps the first object placement area 430a. FIGS. 4E-4F will be described, and reference is made back to FIG. 3. The comparator 25 displays position information on the overlapping area, i.e., the object placement area 430 overlapping the difference area 420, to the display controller 260. Further, the comparator 250 may output position information on the object placement area 430 not overlapping the difference area 420 (hereinafter, "non-overlapping area") to the display controller 260.

The display controller 260 receives the position information on the overlapping area and the position information on the non-overlapping area from the comparator 250. The display controller 260 generates an information presenting image showing the overlapping area, based on the position information on the overlapping area. In this case, the information presenting image is placed so as to be superimposed on the overlapping area. Further, the display controller 260 generates an alert image showing the non-overlapping area, based on the position information on the non-overlapping area. In this case, the alert image is placed so as to be superimposed on the non-overlapping area. FIG. 4E shows an outline of the process in the display controller 260. An information presenting image 440 is placed to overlap the first object placement area 430a of FIG. 4C, and an alert image 450 is placed to overlap the second object placement area 430b of FIG. 4C. The information presenting image 440 and the alert image 450 share a commonality in that they are images for alerting the driver of the presence of the object 410. In contrast to the alert image 450, the information presenting image 440 alerts the driver of the presence of the object 410 with a large prediction error. For this reason, the information presenting image 440 is displayed with a higher brightness than the alert image 450. In one variation, the alert image 450 may not be displayed. FIG. 4F will be described later, and reference is made back to FIG. 3.

The display controller 260 causes the display device 300 to display the information presenting image 440 and the alert image 450. The display device 300 is a HUD and has a display-enabled area 50 inside the field of view of the driver driving the vehicle. The display device 300 displays the information presenting image 440 and the alert image 450 (e.g., displays a virtual image) in the display-enabled area 50. FIG. 4F shows the display in the display-enabled area 50. A first person 460a corresponds to the first object 410a in the captured image 400 of FIG. 1A, and a second person 460b corresponds to the second object 410b in the captured image 400 of FIG. 1A. The information presenting image 440 is displayed such that it overlaps the first person 460a when the driver sees the first person 460a through the front window 12. Further, the alert image 450 is displayed such that it overlaps the second person 460b when the driver sees the second person 460b through the front window 12. In other words, the information presenting image 440 and the alert image 450 are displayed by augmented reality (AR). A publicly known technology may be used in the process of the display controller 260 for displaying the information presenting image 440 and the alert image 450 at such positions, and a description thereof is omitted. In this way, the display controller 260 causes the information presenting image 440 to be displayed to fit to the background. This is equivalent to displaying the information presenting image 440 so as to be superimposed on the overlapping area. The above steps are performed sequentially, and the display of the information presenting image 440 and the alert image 450 is updated sequentially, too.

Figure 5A:
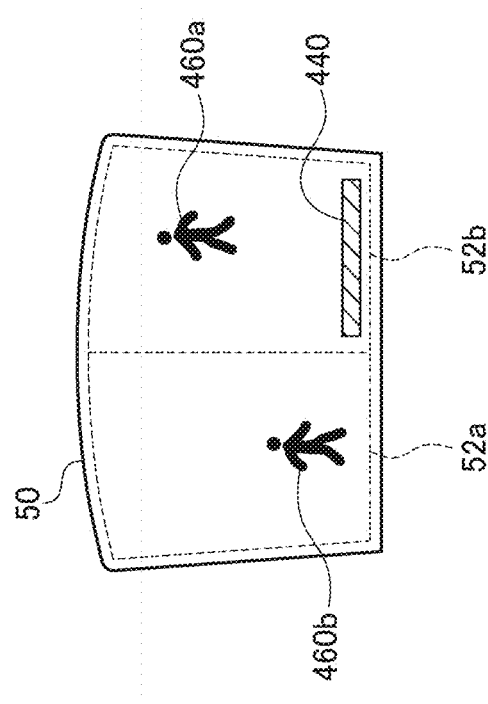
FIGS. 5A-5B show another example of display by the display system of FIG. 3.
Figure 5B:
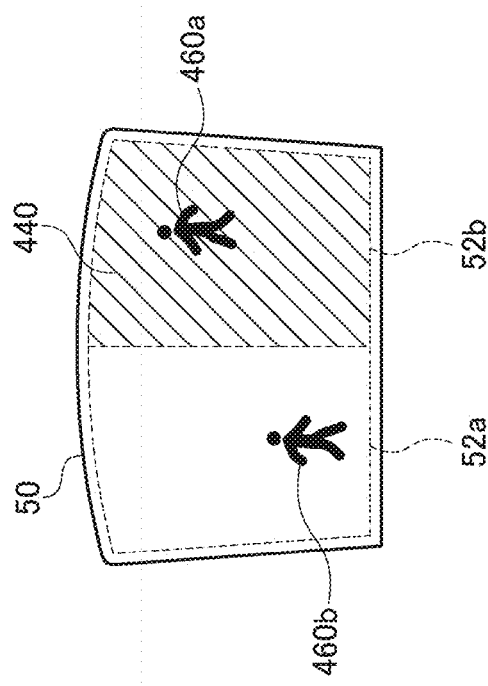

The display of the information presenting image 440 by the display controller 260 is not limited to the mode of FIG. 4F. The display controller 260 may divide the display-enabled area 50 into a plurality of partial areas, and the information presenting image 440 may be displayed in a partial area 52, of the plurality of partial areas, that includes the overlapping area. FIGS. 5A-5B show another example of display by the display system 500. FIGS. 5A-5B show the display-enabled area 50. Referring to FIG. 5A, the display-enabled area 50 is divided into a first partial area 52a placed on the left and a second partial area 52b placed on the right. In the example shown in FIG. 5A, the information presenting image 440 is displayed in the entirety of the second partial area 52b, when the overlapping area is identified in the first person 460a. The information presenting image 440 is shown as, for example, an area that is translucent but colored.

Referring to FIG. 5B, the first partial area 52a and the second partial area 52b are placed, as in FIG. 5A. In the example shown in FIG. 5A, the information presenting image 440 is displayed in the lower part of the second partial area 52b, when the overlapping area is identified in the first person 460a. The information presenting image 440 is shown as, for example, a rectangular or an arcuate bar. The number of partial areas 52 into which the display-enabled area 50 is divided is not limited to "2" and may be "3" or more. The shape of the information presenting image 440 is not limited to the example shown in FIGS. 5A-5B.

The features of the display control device 200 are implemented in hardware such as one or more central processing units (CPU), one or more graphical processing units (GPU), one or more memories, or other large scale integration (LSI) of an arbitrary computer, and in software such as a program loaded into a memory. The figure depicts functional blocks implemented by the cooperation of these elements. Therefore, it will be understood by those skilled in the art that the functional blocks may be implemented in a variety of manners by hardware only or by a combination of hardware and software.

Figure 6:
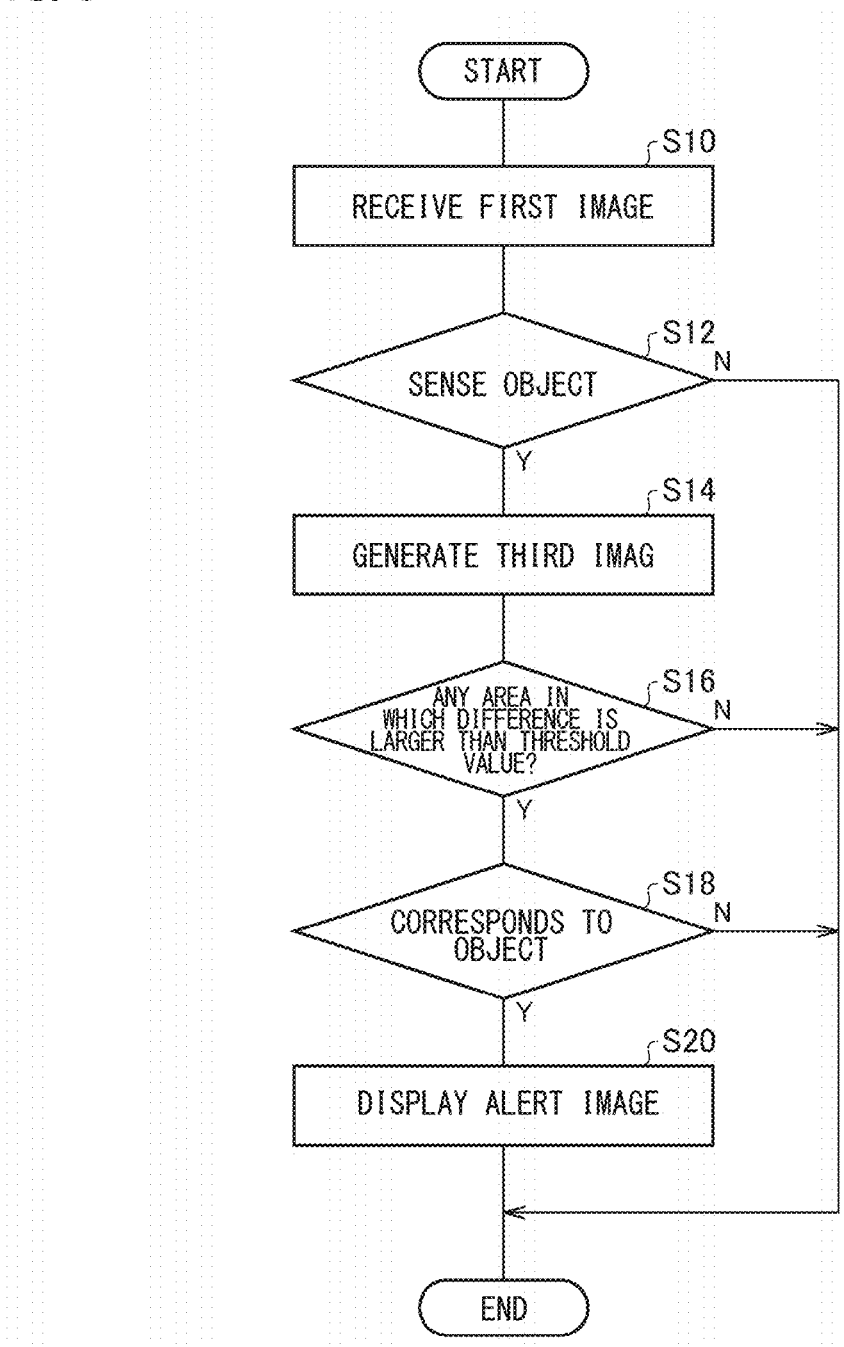
FIG. 6 is a flowchart showing a sequence of steps of display control in the display control device of FIG. 3.

A description will now be given of the operation of the vehicle 1000 having the above-described configuration. FIG. 6 is a flowchart showing a sequence of steps of display control in the display control device 200. The input unit 210 receives the first image (S10). When the sensing unit 240 senses the object 410 (Y in S12), the generator 230 generates the third image from the second image (S14). When there is a difference area 420 in which the difference between the first image and the third image is larger than the threshold value (Y in S16) and when the difference area 420 corresponds to the object 410 (Y in S18), the display controller 260 causes the display device 300 to display the information presenting image 440 (S20). When the sensing unit 240 does not sense the object 410 (N in S12), or when there are not any difference areas 420 in which the difference between the first image and the second image is larger than the threshold value (N in S16), or when the difference area 420 does not correspond to the object 410 (N in S18), the process is terminated.

According to the embodiment, the information presenting image that includes an overlapping area in which the difference between the first image and the third image is larger than the threshold value and in which the first image includes the first object is displayed to fit to the background so that the number of information presenting images on the HUD can be reduced. Further, since the number of information presenting images on the HUD is reduced, the annoyance from the display can be reduced. Further, the information presenting image showing an overlapping area that includes an object with a large prediction error is displayed to fit to the background so that the user can be alerted of the object. Further, the information presenting image is displayed so as to be superimposed on the overlapping area so that the object for which the user is alerted by the information presenting image can be made easily perceivable. Further, the information presenting image is displayed in the partial area, of a plurality of partial areas, that includes an overlapping area so that the process can be simplified.

Embodiment 2

A description will now be given of embodiment 2. Like embodiment 1, embodiment 2 relates to a display system including a display control device for controlling the display on a HUD. In embodiment 1, it has been described that a large prediction error for an object outside the vehicle increases the likelihood of oversight. Meanwhile, when a situation that increases a prediction error occurs in the vehicle interior, the driver's attention is drawn to that situation. This easily results in oversight of an object outside the vehicle. A situation that increases a prediction error in the vehicle interior could be a situation in which the status of display (an image being displayed, etc.) on one or more display devices provided in the vehicle interior changes, such as display change in the car navigation system, display change in the instrument panel, and display change in a smartphone provided in the vehicle interior (dashboard, etc.). Embodiment 2 is directed to the purpose of alerting the user of an object outside the vehicle even if a situation that increases a prediction error occurs in the vehicle interior. The vehicle 1000 and the display system 500 according to embodiment 2 are of the same type as those of FIGS. 1 and 3. The description below highlights a difference from the foregoing embodiment.

Figure 7A:
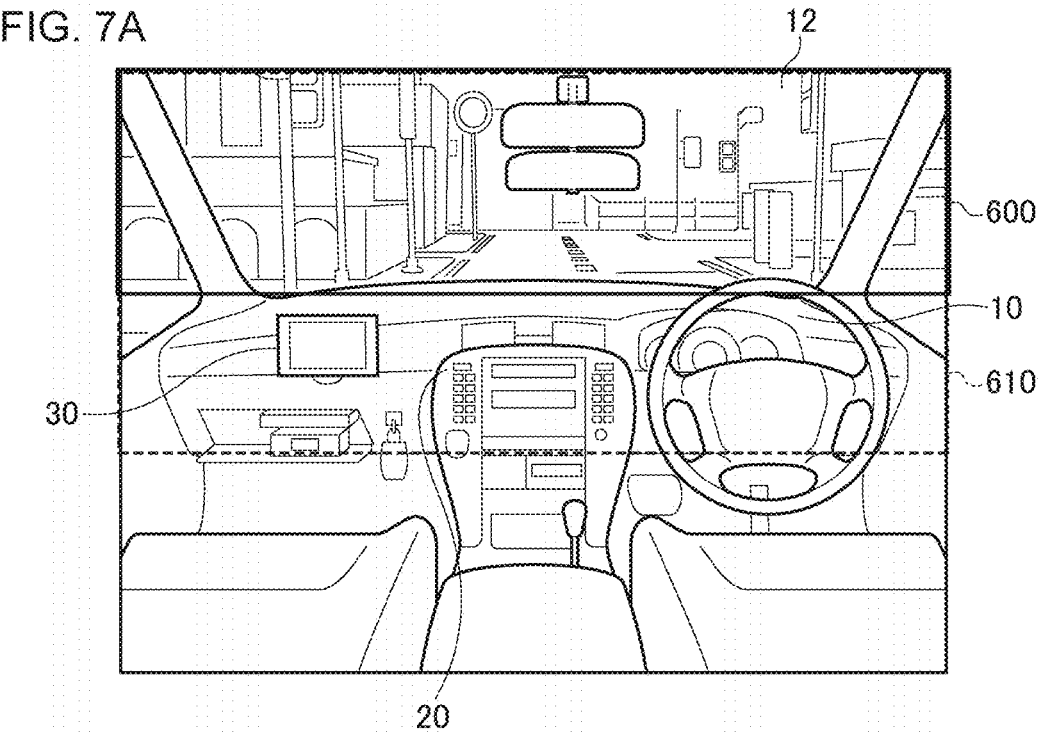
FIGS. 7A-7B schematically show the interior of the vehicle according to embodiment 2.
Figure 7B:
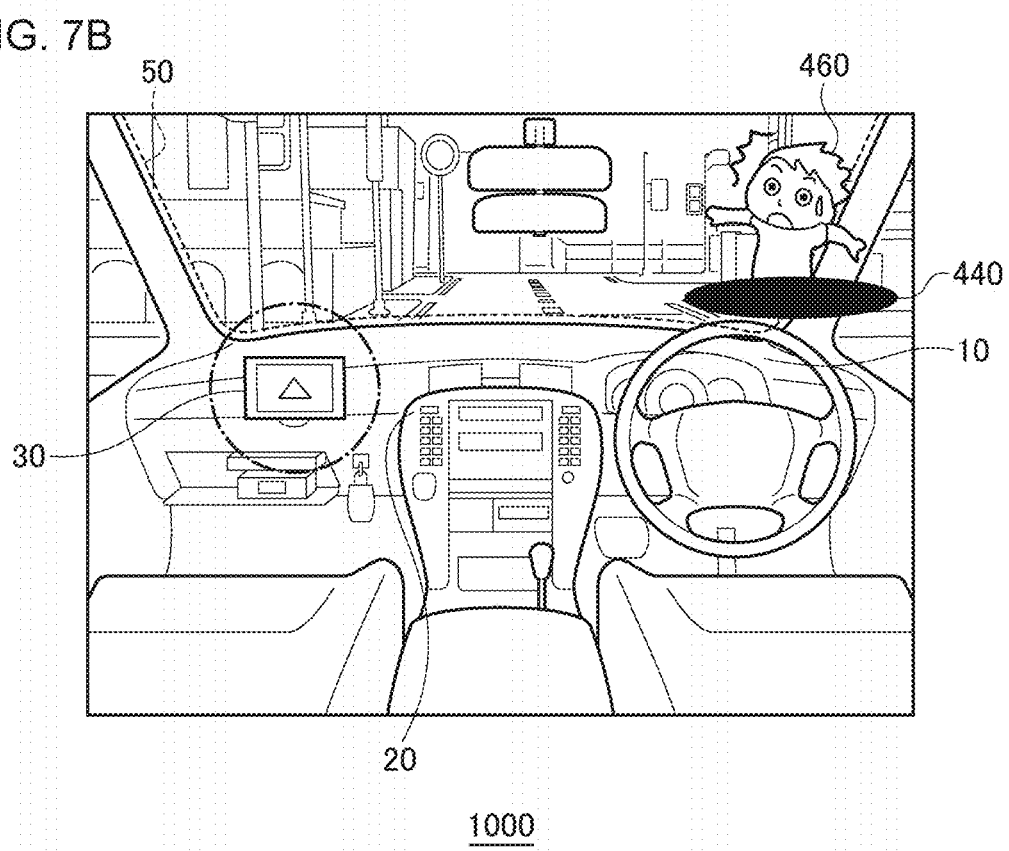

FIGS. 7A-7B schematically show the interior of the vehicle 1000. FIG. 7A is equivalent to FIG. 1. A monitor 30 is provided on the left side of the dashboard 10. The monitor 30 can display a screen of a car navigation system, a screen of television, etc. Further, the imaging range of the imaging device 100 described above is illustrated as a front imaging range 600. The front imaging range 600 is provided outside the vehicle 1000. In embodiment 2, an imaging device (not shown) (hereinafter, "interior imaging device") is also provided in the interior of the vehicle 1000. The imaging range of the interior imaging device is illustrated as a vehicle interior imaging range 610. The interior imaging device is provided so that the vehicle interior imaging range 610 covers the dashboard 10, the center console 20, and the monitor 30. FIG. 7B will be described later, and reference is made back to FIG. 3.

In addition to the process of embodiment 1, the display system 500 performs the following process. The input unit 210 of the display control device 200 receives a video from the interior imaging device. The image at the current point of time included in the video from the interior imaging device can be said to be the "fourth image" capturing a scene in the vehicle interior at the first point of time (current point of time), and the past image can be said to be the "fifth image" capturing a scene in the vehicle interior at the second point of time preceding the first point of time. Generally, a video (moving images) includes a plurality of fifth images (a sequence of frame images) captured at different second points of time. In the following description, the term "fifth image" may refer to a single image or generically refer to a plurality of images. The input unit 210 outputs a plurality of images to the storage 220, the sensing unit 240, and the comparator 250.

The storage 220 receives the plurality of images from the input unit 210. The storage 220 stores the plurality of images for a certain period of time and then outputs the images to the generator 230. The generator 230 receives the plurality of images from the storage 220. The generator 230 is provided with a neural network such as a PredNet and generates an image that predicts a scene in the vehicle interior at the first point of time (hereinafter, "sixth image") by inputting a plurality of fifth images to the neural network, In other words, the sixth image is an image that predicts the first point of time concurrent with the fourth image from the fifth image captured at the second point of time. The generator 230 outputs the sixth image thus generated to the comparator 250.

The sensing unit 240 receives a plurality of images from the input unit 210. The sensing unit 240 senses a portion in the fourth image excluding the front imaging range 600, i.e., an object included in the vehicle interior, by subjecting the fourth image, of the plurality of images, to a pattern matching process. The portion in the fourth image excluding the front imaging range 600 is preset. The object corresponds to, for example, the monitor 30 of FIG. 7A. Further, the sensing unit 240 sets an area that encircles the object thus sensed (hereinafter, referred to as "object placement area") in the fourth image. The sensing unit 240 outputs position information on the object placement area thus set to the comparator 250.

The comparator 250 receives a plurality of images, and, in particular, the fourth image, from the input unit 210, receives the sixth image from the generator 230, and receives the position information on the object placement area from the sensing unit 240. The comparator 250 generates an image (hereinafter, referred to as "comparison image") showing a difference between the fourth image and the sixth image by calculating the difference in units of pixels. When there is an area in the comparison image in which the difference is larger than a predetermined threshold value, the comparator 250 identifies that area (hereinafter, "difference area"). A difference area could be an area in which the difference between the fourth image and the sixth image is large, i.e., an area in which the prediction error is large. Further, the comparator 250 compares the position information on the difference area with the position information on the object placement area 430 and identifies whether there is an area in which they overlap (hereinafter, "an overlapping area").

FIG. 7B shows a case in which the display on the monitor 30 is changed from that of FIG. 7A. The object placement area is set for the monitor 30, and the prediction error is large due to a change in the display on the monitor 30. Therefore, the monitor 30 is identified by the comparator 250 as an overlapping area. This represents a situation in which the driver's attention is drawn to the monitor 30 due to the change in the display on the monitor 30 in the vehicle interior so that oversight of the person 460 outside the vehicle 1000 easily occurs. Reference is made back to FIG. 3.

As in embodiment 1, when the comparator 250 identifies an overlapping area for the person 460, the display controller 260 causes the information presenting image 440 to be displayed such that it is superimposed on the overlapping area as shown in FIG. 7B. In this process, the display mode of the information presenting image is changed depending on whether there is an overlapping area for the monitor 30. When there is an overlapping area for the monitor 30, for example, the brightness of the information presenting image 440 is configured to be higher than when there is not an overlapping area for the monitor 30. Alternatively, the information presenting image 440 may be caused to blink when there is an overlapping area for the monitor 30. Further, an alert sound may be output, or the brightness of the display on the monitor 30 may be lowered when there is an overlapping area for the monitor 30.

According to this embodiment, the display mode of the information presenting image is changed depending on whether there is a further overlapping area in the vehicle interior for which the prediction error is large. Therefore, the driver can be alerted of the magnitude of a prediction error related to one or more objects outside the vehicle even in a situation in which the driver's attention is likely to be diverted from outside the vehicle to inside the vehicle because of a change in the status of display on one or more display devices provided in the vehicle interior. Further, the presence of an object outside the vehicle can be made known to the driver because the attention is drawn to the information presenting image even in a situation in which the vehicle interior is likely to draw the attention of the driver.

Third Embodiment

A description will now be given of embodiment 3. Embodiment 3 represents a variation to embodiment 1. The description below highlights a difference from the foregoing embodiment.

Figure 8:
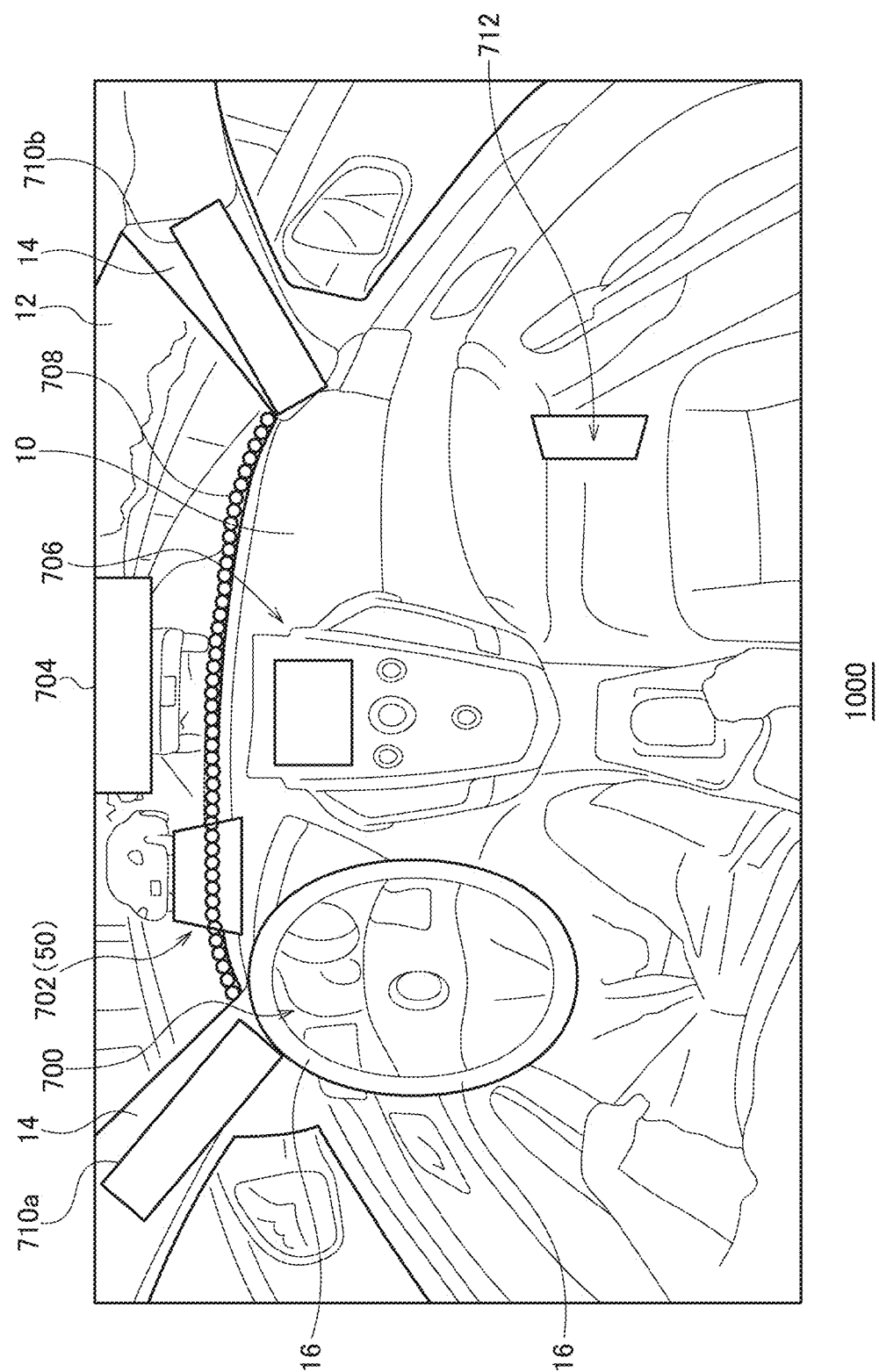
FIG. 8 schematically shows the interior of the vehicle according to embodiment 3.

FIG. 8 schematically shows the interior of the vehicle 1000 and shows a view of the interior of the vehicle 1000 from the rear. The figure shows a configuration of the interior of a pattern different from that of FIG. 1. The configuration of the interior of the vehicle 1000 may be a combination of FIG. 1 and FIG. 8. A meter display 700 is a display for displaying the meter 18 of FIG. 1 or a center information display (CID) provided around the meter 18. A HUD 702 corresponds to the display-enabled area 50 of FIG. 1. Hereinafter, the HUD 702 and the display-enabled area 50 are used without making any distinction therebetween. The HUD 702 may be equipped to display an image on the entirety of the front window 12 as shown in FIG. 1 or may be equipped to display an image on a part of the front window 12 as shown in FIG. 8.

A mirror display 704 is an electronic mirror. The center display 706 is a display provided in the center console 20. An light emitting diode (LED) display 708 is comprised of a plurality of LEDs arranged on the dashboard 10. The LED display 708 may be comprised of a single LED. A first pillar display 710a and a second pillar display 710b, which are generically referred to as pillar displays 710, are displays respectively provided in the left and right pillars 14. The pillar display 710 may be an LED. Sound for auditory perception or a haptic display for tactile perception may be provided in addition to these displays. Therefore, the "displays" described so far may be "presentation". The same applies hereinafter.

A speaker 712 can output sound. Further, an LED or a vibrator may be provided in the steering 16. An aroma diffuser may be provided, or a vibrator may be provided in the seat. These devices are connected to the display control device 200 (control device) of the display system 500.

Figure 9:
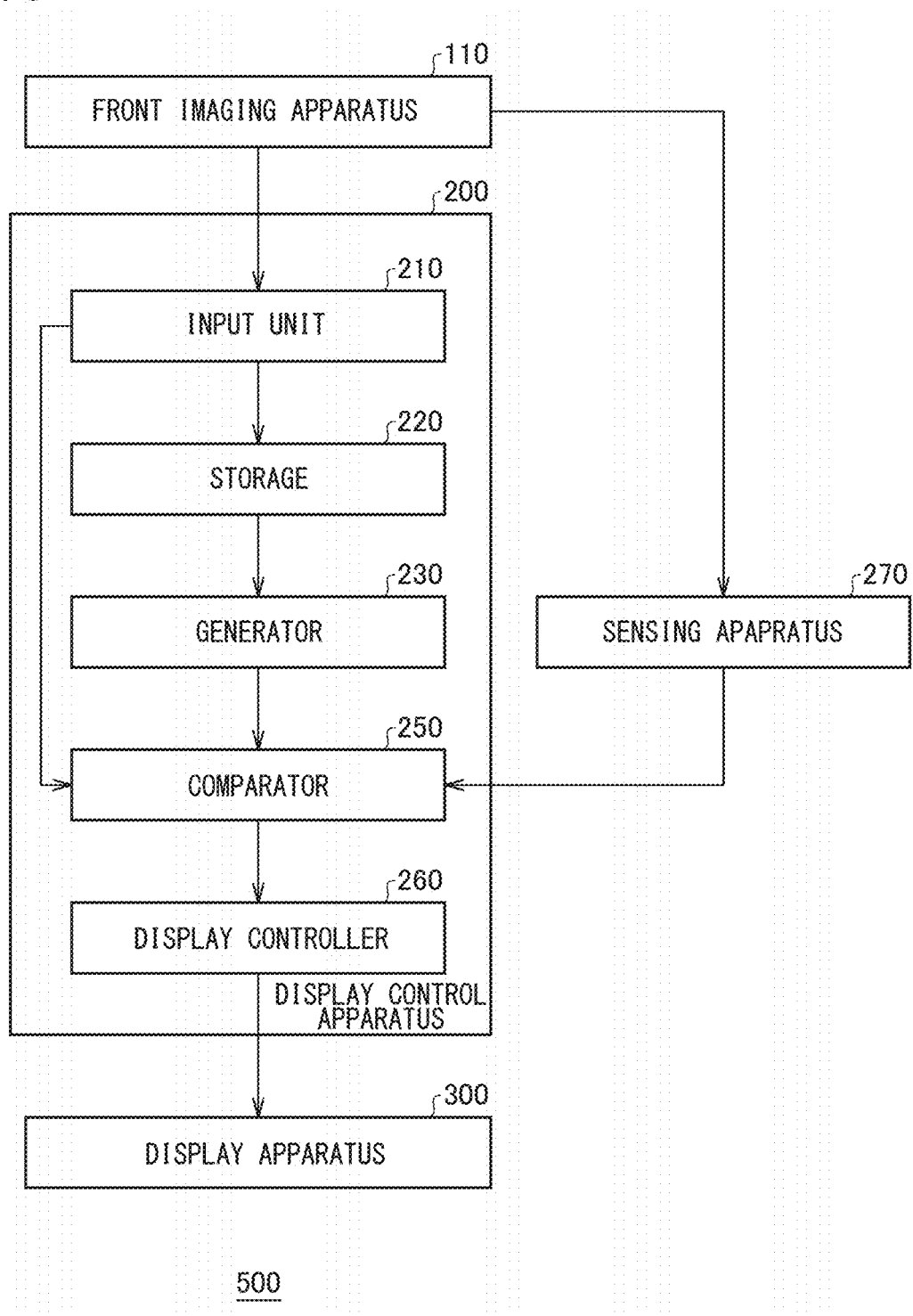
FIG. 9 shows a configuration of the display system mounted on the vehicle.

FIG. 9 shows a configuration of the display system 500 mounted on the vehicle 1000. The display system 500 includes a front imaging device 110, a display control device 200, a sensing device 270, a display device 300. The front imaging device 110 is an imaging device 100 that captures an image of a scene in front. The display control device 200 includes an input unit 210, a storage 220, a generator 230, a comparator 250, and a display controller 260. The sensing unit 240 is included in the display control device 200 of FIG. 3 but is not included in the display control device 200 of FIG. 9. The sensing device 270 has the function of the sensing unit 240 and is connected to the front imaging device 110 and the display control device 200. The sensing device 270 is included in, for example, advanced driver-assistance systems (ADAS) so that the sensing device 270 may be referred to as ADAS. The display device 300 includes the meter display 700, the HUD 702, the mirror display 704, the center display 706, the LED display 708, the pillar displays 710, etc. shown in FIG. 8.

As described above, the comparator 250 receives the first image from the input unit 210 and receives the third image from the generator 230. The comparator 250 also receives position information on the object placement area 430 from the sensing device 270. The comparator 250 calculates a prediction error by calculating a difference between the first image and the third image in units of pixels. The prediction error may be derived in units of pixels or may be derived in units of areas including a set of a certain number of pixels (hereinafter, referred to as "partial areas"). The comparator 250 derives a prediction error for the object placement area 430 by calculating an integrated value of the prediction error at the position information on the object placement area 430 and then diving the integrated value by the size of the object placement area 430. The comparator 250 outputs the position information and the prediction error for the object placement area 430 to the display controller 260.

The display controller 260 receives the position information and the prediction error for the object placement area 430 from the comparator 250. FIGS. 10A-10G show an outline of the operation of the display system 500. FIG. 10A shows a table stored in the display controller 260. A first threshold value and a second threshold value (the first threshold value>the second threshold value) are defined for the prediction error. The prediction error is defined to be "low" in the case the prediction error is equal to or smaller than the first threshold value. Further, the prediction error is defined to be "medium" in the case the prediction error is larger than the first threshold value and equal to or smaller than the second threshold value. The prediction error is defined to be "high" in the case the prediction error is larger than the second threshold value. Mutually different colors are defined for the respective ranges of prediction error. Mutually different brightness levels may be defined for the respective ranges of prediction error. The display controller 260 determines the color corresponding to the received prediction error by comparing the received prediction error with the table. FIGS. 10B-10G will be described later, and reference is made back to FIG. 9.

The display controller 260 generates the information presenting image 440 by using the determined color. The alert image 450 in embodiment 1 corresponds to the information presenting image 440 with a small prediction error. Hereinafter, therefore, the alert image 450 may be described as being encompassed by the information presenting image 440. The display controller 260 causes the display device 300 to display the information presenting image 440.

FIGS. 10B-10D show captured images 400 input to the input unit 210. These correspond to the first image that exhibits a transition between the states in FIGS. 10B-10D. The first image shown in FIG. 10B does not include the object 410 such as a person. The object 410 appears in the first image shown in FIG. 10C. In FIG. 10D, the object 410 that appeared in FIG. 10C moves. FIG. 10E shows an image that the display controller 260 displays in the display-enabled area 50 to correspond to FIG. 10B. Since the person 460 is not included, the alert image 450 is not included. FIG. 10F shows an image that the display controller 260 displays in the display-enabled area 50 to correspond to FIG. 10C. Since the person 460 is included and the prediction error for the person 460 is "high", the information presenting image 440 is displayed with a color corresponding to a "high" prediction error. FIG. 10G is an image that the display controller 260 displays in the display-enabled area 50 to correspond to FIG. 10D. Since the person 460 is included, and the prediction error for the person 460 is "low", the information presenting image 440 is displayed with a color corresponding to a "low" prediction error. The information presenting image 440 corresponds to the alert image 450.

In other words, the display controller 260 changes the display mode of the information presenting image 440 in accordance with the magnitude of prediction error, which is a difference between the first image and the third image. Therefore, the display controller 260 changes the display mode of the information presenting image 440 even if there is only one object such as the person 460. For example, the display controller 260 changes the color or the brightness of the information presenting image 440 when the likelihood of oversight of the object changes. Further, the display controller 260 changes the display mode gradually. A trigger associated with a change in the likelihood of oversight of the object is exemplified by an elapse of a certain period of time since the display, detection of gaze, detection of an avoidance behavior such as deceleration and steering in the opposite direction.

A description will now be given of a variation. In the variation, the information presenting image for the object 410 sensed by the sensing device 270 (hereinafter, referred to as "manifest information presenting image") and the information presenting image determined by the prediction error (hereinafter, "potential information presenting image") are displayed separately. The comparator 250 of FIG. 9 receives the first image from the input unit 210 and receives the third image from the generator 230. Further, the comparator 250 receives the position information on the object placement area 430 from the sensing device 270. As described above, the comparator 250 derives a prediction error by calculating a difference between the first image and the third image in units of pixels. The comparator 250 outputs the position information and the derived prediction error for the object placement area 430 to the display controller 260.

Figure 11A:
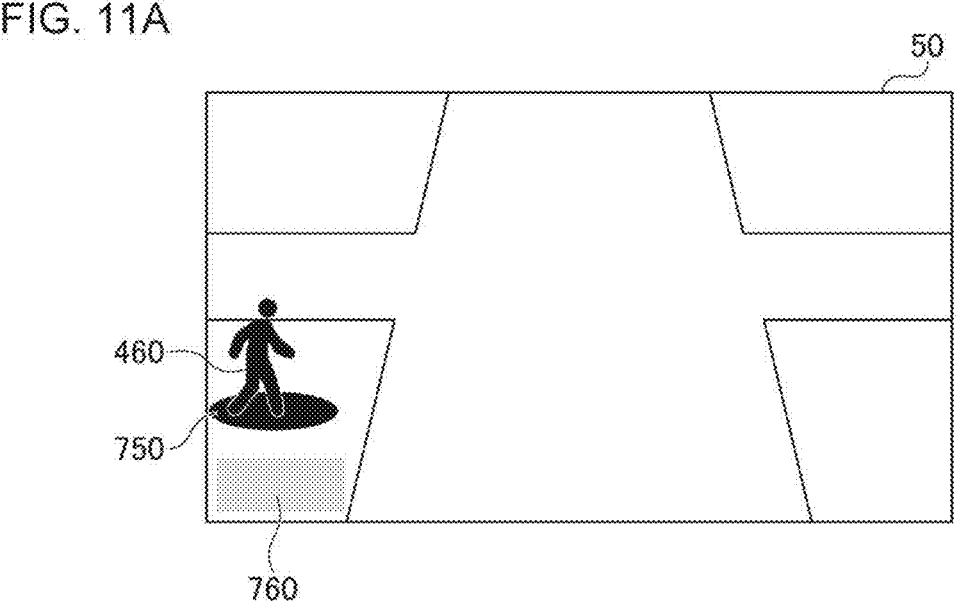
FIGS. 11A-11B show an outline of an alternative operation of the display system according to embodiment 3.
Figure 11B:
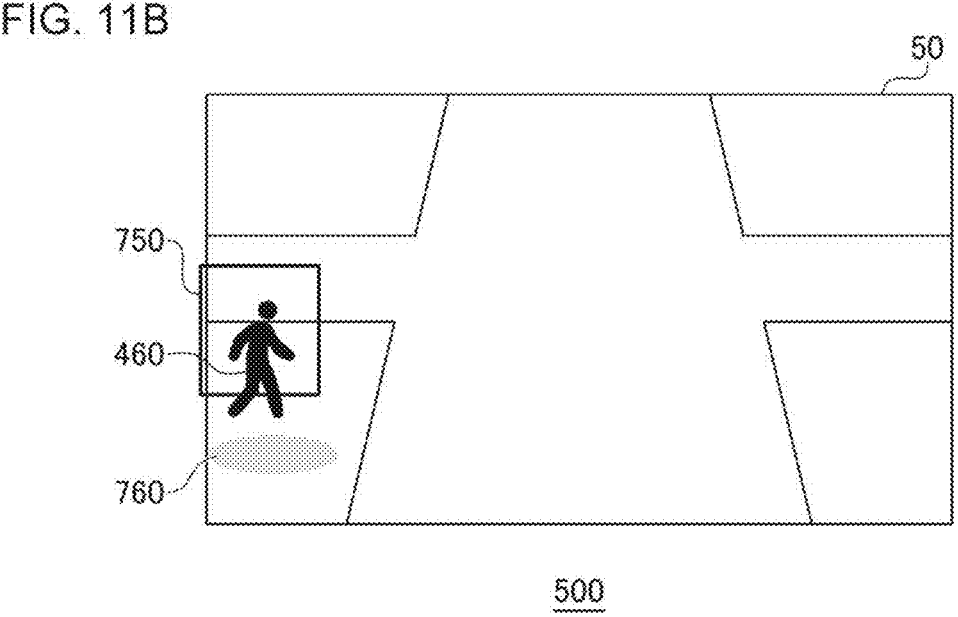

The display controller 260 receives the position information and the derived prediction error for the object placement area 430 from the comparator 250. FIGS. 11A-11B show an outline of an alternative operation of the display system 500. The figures show images displayed by the display controller 260 in the display-enabled area 50. Referring to FIG. 11A, the person 460 is included. The position information indicating the position where the person 460 is located represents the position information on the object placement area 430. The display controller 260 places a manifest information presenting image 750 for the person 460 based on the position information on the object placement area 430. The manifest information presenting image 750 has, for example, an elliptical shape and is provided to overlap a portion of the person 460. Further, the display controller 260 places a potential information presenting image 760 at a position where the prediction error is larger than a predetermined value. In this case, the potential information presenting image 760 having a rod-like shape is placed at horizontal coordinates where the prediction error is larger than the predetermined value and at fixed vertical coordinates (e.g., the lowermost coordinates). The mode of display of the potential information presenting image 760 may be changed in accordance with the magnitude of prediction error by using the table of FIG. 10A.

Like FIG. 11A, FIG. 11B includes the person 460. The display controller 260 places the manifest information presenting image 750 for the person 460 based on the position information on the object placement area 430. The manifest information presenting image 750 has a frame-like shape that encircles the person 460. Further, the display controller 260 places the potential information presenting image 760 at a position where the prediction error is larger than the predetermined value. The potential information presenting image 760 has an elliptical shape.

A description will now be given of a further variation. In the further variation, the display of the potential information presenting image is changed in accordance with the danger associated with the object 410. The comparator 250 of FIG. 9 receives the first image from the input unit 210 and receives the third image from the generator 230. Further, the comparator 250 receives the position information on the object placement area 430 from the sensing device 270. In that process, the comparator 250 also receives information (e.g., time-to-collision (TTC)) indicating the distance between the object 410 and the vehicle 1000 from the sensing device 270. TTC denotes a time that remains before a collision. The smaller the value of TTC, the shorter the distance between the object 410 and the vehicle 1000. This represents an increase in the danger associated with the object 410. The value of TTC can be said to be the result of sensing a spacing between the vehicle 1000 and the object 410. Time head way (THW) or risk perception may be used as a result of sensing a spacing between the vehicle 1000 and the object 410 instead of TTC. THW and risk perception will be described later.

Figure 12A:
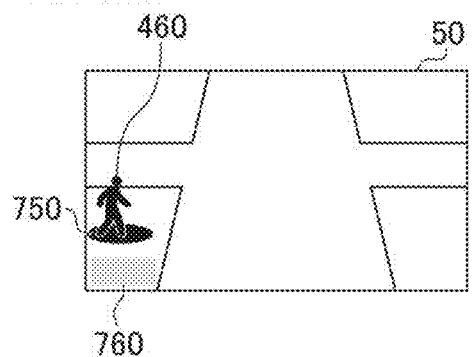
FIGS. 12A-12D show an outline of a still alternative operation of the display system according to embodiment 3.
Figure 12B:
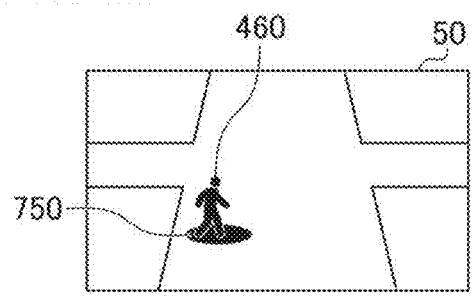

The display controller 260 receives the position information on the object placement area 430, the value of TTC, and the derived prediction error from the comparator 250. FIGS. 12A-12D show an outline of a still alternative operation of the display system 500. The figures show images displayed by the display controller 260 in the display-enabled area 50. FIG. 12A shows an image displayed by the display controller 260 in the display-enabled area 50 when the value of TTC is equal to or greater than a predefined value. As in FIG. 11A, the manifest information presenting image 750 and the potential information presenting image 760 are included. FIG. 12B shows an image displayed by the display controller 260 in the display-enabled area 50 when the value of TTC is smaller than the predefined value, i.e., when the danger associated with the object 410 has increased. Only the manifest information presenting image 750 is displayed, and the potential information presenting image 760 is not displayed.

Figure 12C:
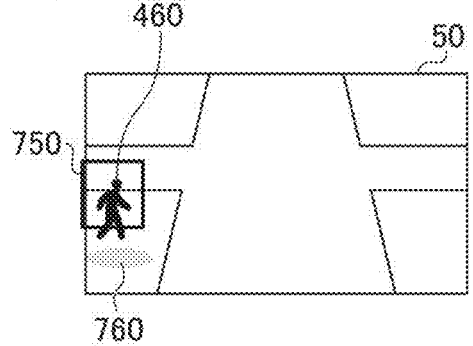
Figure 12D:
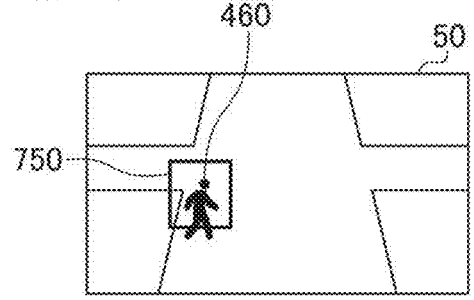

FIG. 12C shows an image displayed by the display controller 260 in the display-enabled area 50 when the value of TTC is equal to or greater than the predefined value. As in FIG. 11B, the manifest information presenting image 750 and the potential information presenting image 760 are included. FIG. 12D shows an image displayed by the display controller 260 in the display-enabled area 50 when the value of TTC is smaller than the predefined value, i.e., when the danger associated with the object 410 has increased. Only the manifest information presenting image 750 is displayed, and the potential information presenting image 760 is not displayed. In other words, the display of the manifest information presenting image 750 is prioritized when the danger is imminent. In that process, it is preferred to make the potential information presenting image 760 less noticeable by, for example, lowering the brightness gradually.

According to the embodiment, the mode of display of the information presenting image is changed in accordance with the magnitude of prediction error so that the user can be alerted of the magnitude of prediction error, i.e., a potential risk associated with a scene or an object that is difficult for human beings to perceive. Further, the potential information presenting image is not displayed or made less noticeable when the manifest information presenting image is displayed so that the user's attention can be drawn to the manifest information presenting image easily.

Embodiment 4

A description will now be given of embodiment 4. Embodiment 4 relates to the display system 500 like that of embodiment 3. In embodiment 4, a situation in which the display control device 200 receives the value of TTC associated with the object 410 from the sensing device 270, but it is not necessary to display the manifest information presenting image depending on the value of TTC. The display system 500 according to embodiment 4 is of the same type as that of FIG. 9. The description below highlights a difference from the foregoing embodiment.

The sensing device 270 of FIG. 9 senses the value of TTC associated with the object 410. When the value of TTC is smaller than the predefined value, the sensing device 270 sets the object placement area 430 for alerting of the danger associated with the object 410 and outputs the position information on the object placement area 430 to the display control device 200. In that process, the sensing device 270 may also output the value of TTC to the display control device 200. When the value of TTC is equal to or greater than the predefined value, on the other hand, the sensing device 270 does not set the object placement area 430 because the danger associated with the object 410 is not low. This can be said to be a situation in which the object 410 is sufficiently distanced from the vehicle 1000 as to pose no danger because, as described above, the value of TTC can be said to be the result of sensing a spacing between the vehicle 1000 and the object 410. The sensing device 270 outputs the value of TTC to the display control device 200. The sensing device 270 may output the position information on the object 410 to the display control device 200.

The comparator 250 of the display control device 200 receives the first image from the input unit 210 and receives the third image from the generator 230. Further, the comparator 250 receives the position information on the object 410 and the value of TC from the sensing device 270. The value of TTC in this case has a value equal to or greater than the predefined value in the sensing device 270. As described above, the comparator 250 derives a prediction error by comparing the first image and the third image and calculating a difference between the first image and the third image in units of pixels. In particular, the comparator 250 derives a prediction error for each of the areas (hereinafter, referred to as "divided areas") derived from dividing the first image and the third image into two equal parts on the left and on the right. The comparator 250 outputs the value of TTC and the derived prediction error to the display controller 260.

The display controller 260 receives the value of TTC and the derived prediction error from the comparator 250. FIGS. 13A-13C show an outline of the operation of the display system 500. FIG. 13A shows a table stored in the display controller 260. A first threshold value and a second threshold value (the first threshold value<the second threshold value) are defined for the prediction error. The prediction error is defined to be "low" in the case the prediction error is equal to or smaller than the first threshold value. The prediction error is defined to be "medium" in the case the prediction error is larger than the first threshold value and equal to or smaller than the second threshold value. The prediction error is defined to be "high" in the case the prediction error is larger than the second threshold value.

Further, a third threshold value and a fourth threshold value (the first threshold value>the second threshold value) are defined for TTC. TTC is defined to be "long" when TTC is longer than the third threshold value. Further, TTC is defined to be "medium" when TTC is equal to or less than the third threshold value and longer than the fourth threshold value. TTC is defined to be "short" when TTC is equal to or less than the fourth threshold value.

Mutually different colors are defined for the respective combinations of prediction error and TTC. Mutually different brightness levels may be defined for the respective combinations. The display controller 260 determines the color of the potential information presenting image 760 corresponding to the combination of the prediction error and the value of TTC received by comparing the prediction error and the value of TTC received with the table. To describe it more specifically, by comparing the combination of the prediction error and the value of TTC for one of the partial areas (hereinafter, referred to as "first partial area") with the table, the color corresponding to the first partial area is determined. Further, by comparing the combination of the prediction error and the value of TTC for the other partial area (hereinafter, referred to as "second partial area") with the table, the color corresponding to the second partial area is determined.

FIG. 13B shows an image displayed by the display controller 260 in the display-enabled area 50. The left part of the display-enabled area 50 is defined as the first partial area, and the right part of the display-enabled area 50 is defined as the second partial area. FIG. 13B includes the person 460. The display controller 260 displays a first potential information presenting image 760a in the first partial area including the person 460 and displays a second potential information presenting image 760b in the second partial area not including the person 460. The color determined as described above is used in the first potential information presenting image 760a and the second potential information presenting image 760b.

FIG. 13C shows an image displayed by the display controller 260 in the display-enabled area 50. FIG. 13C includes the first person 460a and the second person 460b. The display controller 260 displays the first potential information presenting image 760a in the first partial area including the first person 460a and the second person 460b and displays the second potential information presenting image 760b in the second partial area not including the first person 460a and the second person 460b. The prediction error and the value of TTC for the first person 460a and the second person 460b of FIG. 13B differ from the prediction error and the value of TTC for the person 460 of FIG. 13B so that the color of the first potential information presenting image 760a of FIG. 13B and the color of the first potential information presenting image 760a of FIG. 13A differ. In other words, the display controller 260 causes the potential information presenting image 760 to be displayed based on the value of TTC and the prediction error. When the value of TTC or the prediction error changes, the display controller 260 changes the mode of display of the potential information presenting image 760.

According to this variation, the mode of display of the information presenting image is changed when the value of TTC or the prediction error changes so that the user can be alerted of a potential risk associated with a scene or an object that is difficult for human beings to perceive.

Embodiment 5

A description will now be given of embodiment 5. Embodiment 5 relates to the display system 500 like that of the foregoing embodiments. In embodiment 3, the display control device 200 receives the position information on the object placement area 430 and the value of TTC associated with the object 410 from the sensing device 270. In embodiment 5, on the other hand, the display control device 200 receives only the result sensed when the sensing device 270 senses the object 410. In a situation like this, it is required to display the potential information presenting image 760 so as not to interfere with the display of the manifest information presenting image 750. The display system 500 according to embodiment 5 is of the same type as that of FIG. 9. The description below highlights a difference from the foregoing embodiment.

When the sensing device 270 of FIG. 9 senses the object 410, the sensing device 270 outputs the result of sensing the object 410 to the display control device 200 and causes the display device 300 to display the manifest information presenting image 750. When the sensing device 270 does not sense the object 410, on the other hand, the sensing device 270 does not output the result of sensing the object 410 to the display control device 200 and does not cause the display device 300 to display the manifest information presenting image 750.

The comparator 250 of the display control device 200 receives the first image from the input unit 210 and receives the third image from the generator 230. Further, when the sensing device 270 senses the object 410, the comparison receives the result of sensing the object 410 from the sensing device 270. As described above, the comparator 250 derives a prediction error by calculating a difference between the first image and the third image in units of pixels. The comparator 250 outputs the derived prediction error to the display controller 260. When the comparator 250 receives the result of sensing, the comparator 250 outputs the result of sensing to the display controller 260.

The display controller 260 receives the derived prediction error from the comparator 250. The display controller 260 places a potential information presenting image 760 at a position where the prediction error is larger than a predetermined value as illustrated in FIG. 11A by performing the same process as performed in embodiment 3. In other words, the display controller 260 causes the potential information presenting image 760 to be displayed based on the prediction error, which is a difference between the first image and the third image. In particular, the display controller 260 causes the manifest information presenting image 750 in the first display mode when the result of sensing is received and causes the manifest information presenting image 750 in the second display mode when the result of sensing is not received. It should be noted here that the first display mode and the second display mode are different.

Figure 14:
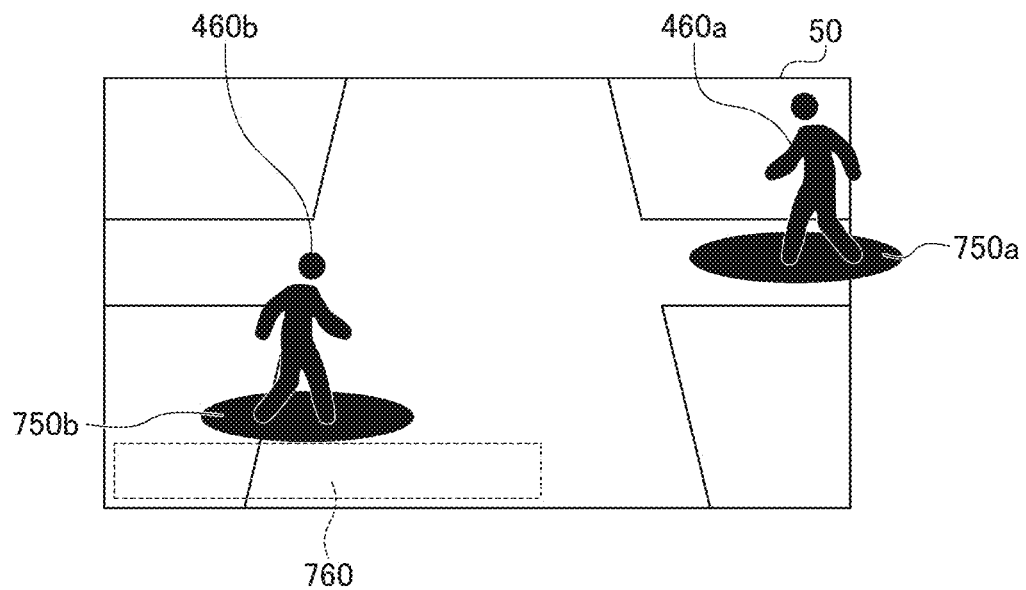
FIG. 14 shows an outline of the operation of the display system according to embodiment 5.

FIG. 14 shows an outline of the operation of the display system 500. In this case, the first person 460a and the second person 460b are sensed as the object 410 by the sensing device 270. Therefore, the sensing device 270 causes a first manifest information presenting image 750a for the first person 460a and a second manifest information presenting image 750b for the second person 460b to be displayed in the display-enabled area 50. Since the result of sensing is received from the sensing device 270, the display controller 260 also causes the potential information presenting image 760 to be displayed in the display-enabled area 50 in the first display mode. The first display mode displays an image in a lighter color or a lower brightness than the second display mode. This makes the manifest information presenting image 750 more noticeable and makes the potential information presenting image 760 less noticeable.

When the sensing device 270 does not sense the object 410, on the other hand, the sensing device 270 does not cause the manifest information presenting image 750 to be displayed in the display-enabled area 50. Further, the display controller 260 causes the potential information presenting image 760 to be displayed in the display-enabled area 50 in the second display mode because the result of sensing from the sensing device 270 is not received.

Figure 15A:
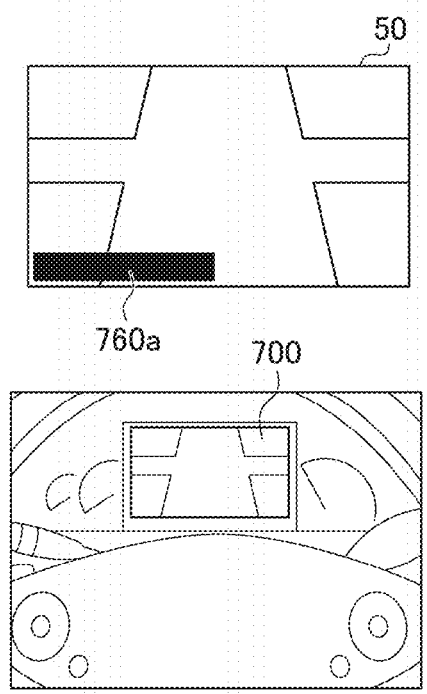
FIGS. 15A-15B show an outline of an alternative operation of the display system according to embodiment 5.
Figure 15B:
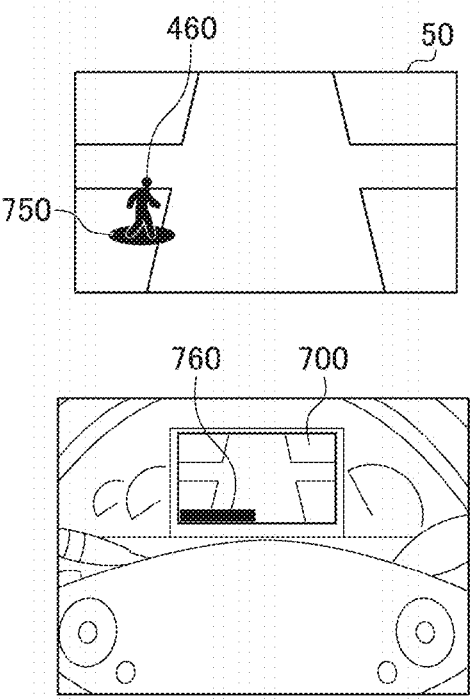

FIGS. 15A-15B show an outline of an alternative operation of the display system 500. Referring to FIG. 15A, the sensing device 270 does not detect the object 410. Therefore, the sensing device 270 does not cause the manifest information presenting image 750 to be displayed in the display-enabled area 50 and causes the potential information presenting image 760 to be displayed in the display-enabled area 50. Referring to FIG. 15b, the sensing device 270 senses the object 410. Therefore, the sensing device 270 causes the manifest information presenting image 750 for the person 460 to be displayed in the display-enabled area 50, and the display controller 260 causes the potential information presenting image 760 to be displayed on the meter display 700. In other words, when the manifest information presenting image 750 is displayed, the potential information presenting image 760 is displayed on a display different from the display that displays the manifest information presenting image 750.

According to this embodiment, the mode of display of the potential information presenting image is changed depending on whether the manifest information presenting image is displayed. Therefore, interference between the manifest information presenting image and the potential information presenting image can be suppressed.

Embodiment 6

A description will now be given of embodiment 6. Embodiment 6 relates to the display system 500 like that of the foregoing embodiments. The display control device 200 described above includes the sensing unit 240 or is connected to the sensing device 270. Meanwhile, the display control device 200 according to embodiment 6 does not include the sensing unit 240 and is not connected to the sensing device 270. The sensing device 270 can display the manifest information presenting image 750, and the display controller 260 can display the potential information presenting image 760. Therefore, the display control device 200 does not recognize whether the sensing device 270 is displaying the manifest information presenting image 750 when the display control device 200 displays the potential information presenting image 760. In a situation like this, it is required to display the potential information presenting image 760 so as not to interfere with the display of the manifest information presenting image 750. The description below highlights a difference from the foregoing embodiment.

Figure 16:
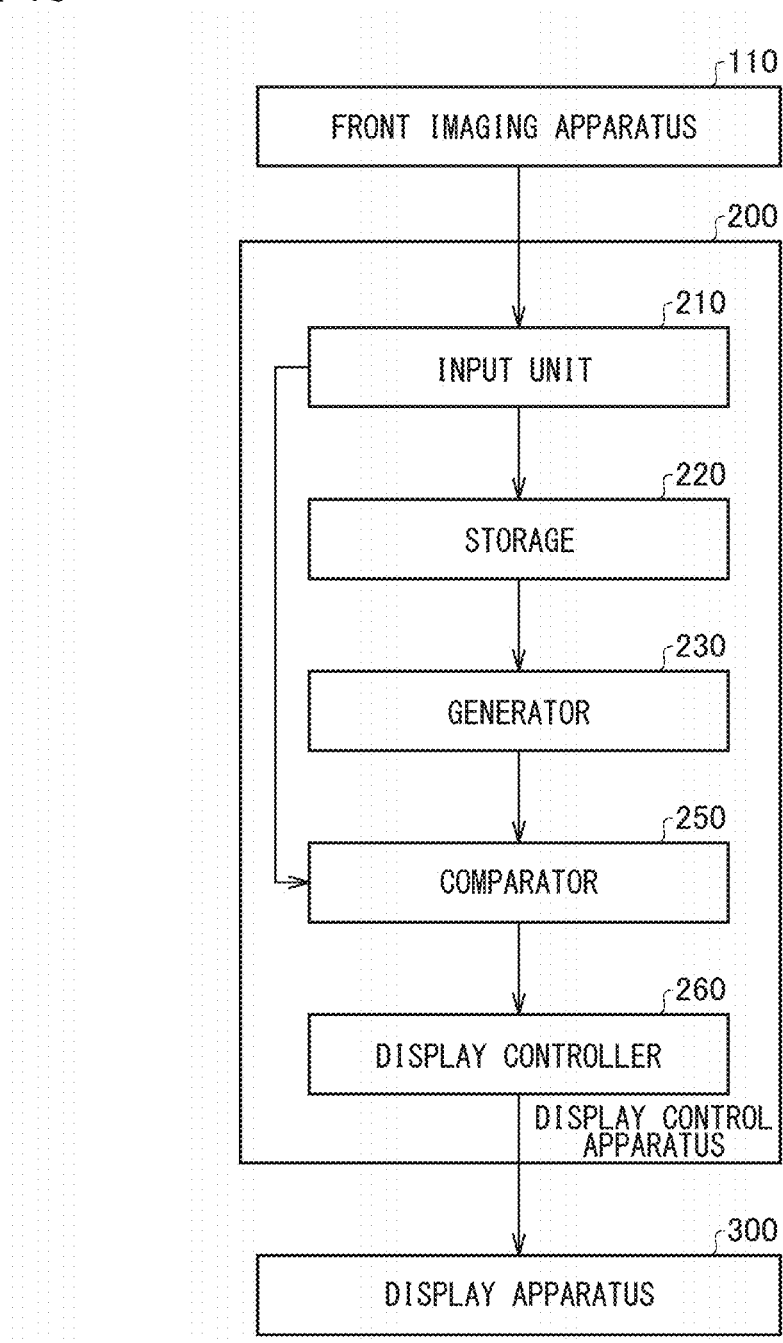
FIG. 16 shows a configuration of the display system according to embodiment 6.

FIG. 16 shows a configuration of the display system 500. The display system 500 includes a front imaging device 110, a display control device 200, and a display device 300. The display control device 200 includes an input unit 210, a storage 220, a generator 230, a comparator 250, and a display controller 260. Unlike the configuration of FIG. 9, the display system 500 does not include the sensing device 270.

Figure 17:
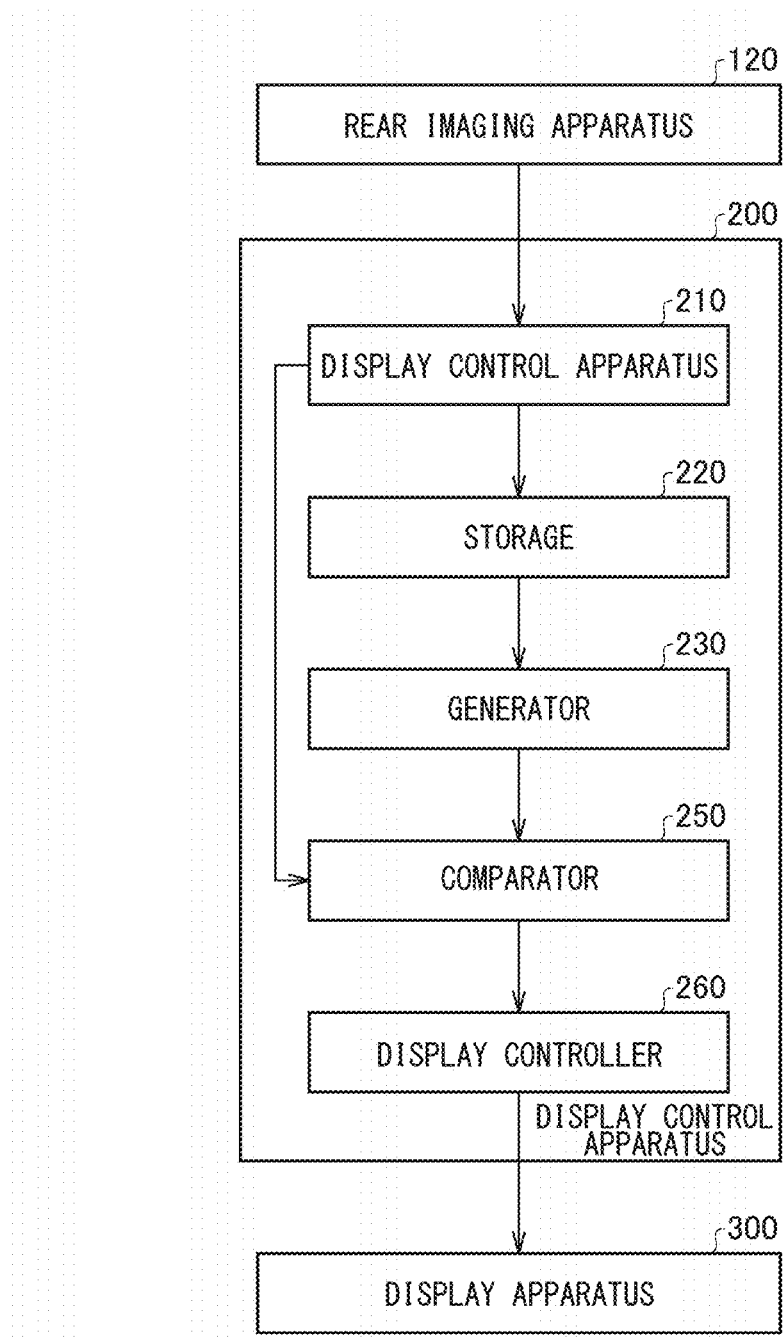
FIG. 17 shows an alternative configuration of the display system according to embodiment 6.

FIG. 17 shows an alternative configuration of the display system 500. The display system 500 includes a rear imaging device 120, the display control device 200, and the display device 300. The rear imaging device 120 is the imaging device 100 that captures an image behind the vehicle 1000. The display control device 200 includes an input unit 210, a storage 220, a generator 230, a comparator 250, and a display controller 260. Unlike the configuration of FIG. 9, the display system 500 does not include the sensing device 270.

Figure 18A:
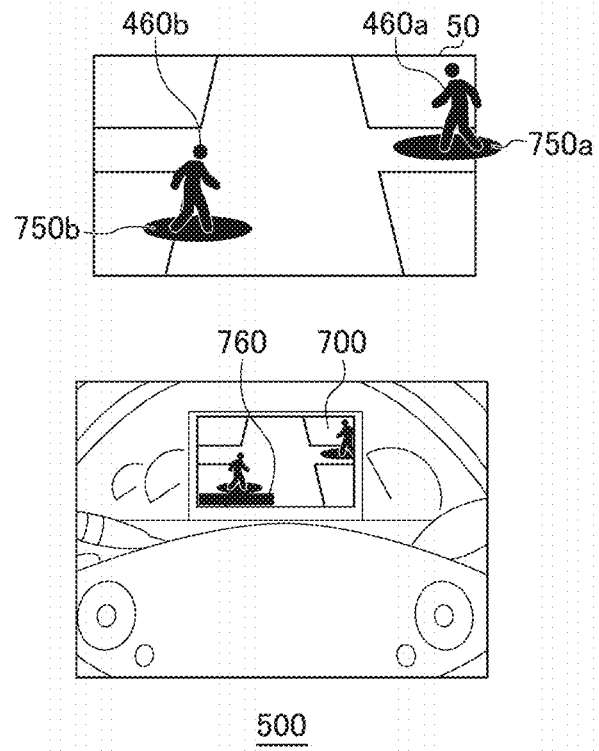
FIGS. 18A-18B show an outline of the operation of the display system according to embodiment 6.
Figure 18B:
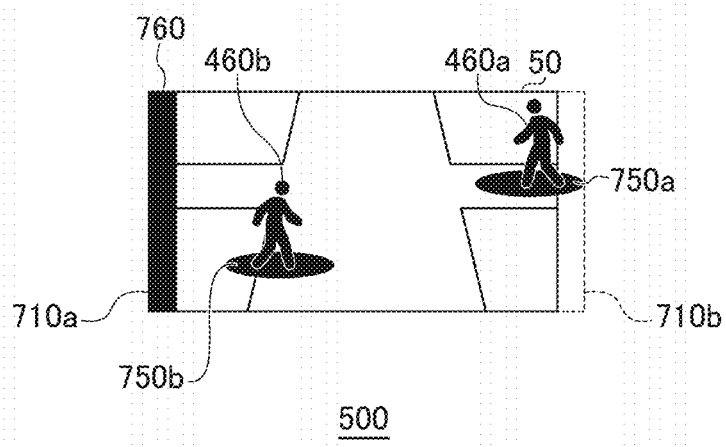

FIGS. 18A-18B show an outline of the operation of the display system 500. FIG. 18A shows an image displayed in the display-enabled area 50 and on the meter display 700. The sensing device 270 generates the manifest information presenting image 750 by sensing the object 410. The sensing device 270 causes a first manifest information presenting image 750a for the first person 460a and a second manifest information presenting image 750b for the second person 460b to be displayed in the display-enabled area 50. The display controller 260 of the display control device 200 causes the potential information presenting image 760 to be displayed on the meter display 700 based on the prediction error, which is a difference between the first image and the third image. Generation of the potential information presenting image 760 by the display controller 260 is as already described, and a description thereof is omitted. When the meter display 700 is referred to as the first display device, the display-enabled area 50 will be referred to as the second display device. The first display device differs from the second display device.

FIG. 18B shows an image displayed in the display-enabled area 50 and on the pillar display 710. The sensing device 270 generates the manifest information presenting image 750 by sensing the object 410. The sensing device 270 causes a first manifest information presenting image 750a for the first person 460a a second manifest information presenting image 750b for the second person 460b to be displayed in the display-enabled area 50. The display controller 260 of the display control device 200 causes the potential information presenting image 760 to be displayed on the pillar display 710 based on the prediction error, which is a difference between the first image and the third image. In this case, the potential information presenting image 760 is displayed on the first pillar display 710a. Generation of the potential information presenting image 760 by the display controller 260 is as already described, and a description thereof is omitted. When the pillar display 710 is referred to as the first display device, the display-enabled area 50 will be referred to as the second display device. The first display device differs from the second display device.

Figure 19:
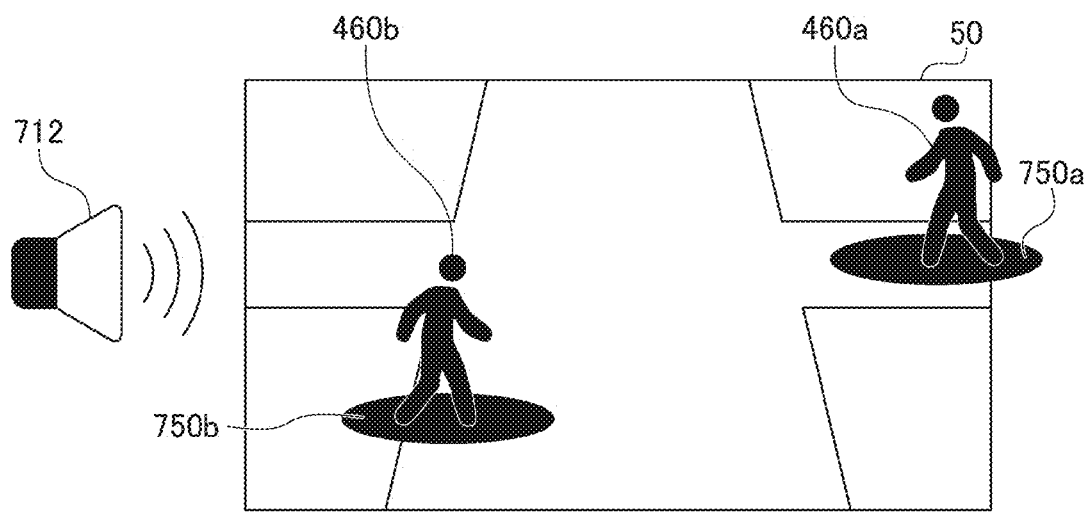
FIG. 19 shows an outline of an alternative operation of the display system according to embodiment 6.

FIG. 19 shows an outline of the operation of an alternative operation of the display system 500. The sensing device 270 generates the manifest information presenting image 750 by sensing the object 410. The sensing device 270 causes a first manifest information presenting image 750a for the first person 460a a second manifest information presenting image 750b for the second person 460b to be displayed in the display-enabled area 50. The display controller 260 of the display control device 200 generates sound corresponding to the potential information presenting image 760 (hereinafter, referred to as "potential information presenting sound") based on the prediction error, which is a difference between the first image and the third image. The display controller 260 outputs the potential information presenting sound from the speaker 712. The display controller 260 in this case may be called a controller.

According to this embodiment, the manifest information presenting image and the potential information presenting image are displayed on different display devices so that interference between the manifest information presenting image and the potential information presenting image can be suppressed.

Embodiment 7

A description will now be given of embodiment 7. Embodiment 7 relates to the display system 500 like that of the foregoing embodiments. In embodiment 7, the display control device 200 is mounted on the vehicle 1000, and the embodiment is non-limiting as to whether the sensing unit 40 or the sensing device 270 is mounted on the vehicle 1000. It is therefore possible to display the potential information presenting image 760 regardless of whether it is possible to display the manifest information presenting image 750. The display device 300 according to embodiment 7 is of the same type as that of FIG. 16 and FIG. 17. The description below highlights a difference from the foregoing embodiment.

The comparator 250 of the display control device 200 derives a prediction error, which is a difference between the first image and the third image, by comparing the first image and the third image. The display controller 260 causes the display device 300 to display the potential information presenting image 760 based on the prediction error. When the prediction error changes, the display controller 260 changes the mode of display of the potential information presenting image 760.

Figure 20A:
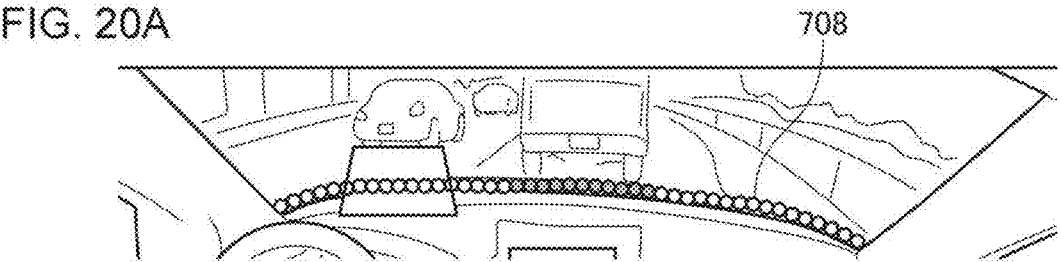
FIGS. 20A-20E show an outline of display on the LED display according to embodiment 7.
Figure 20B:
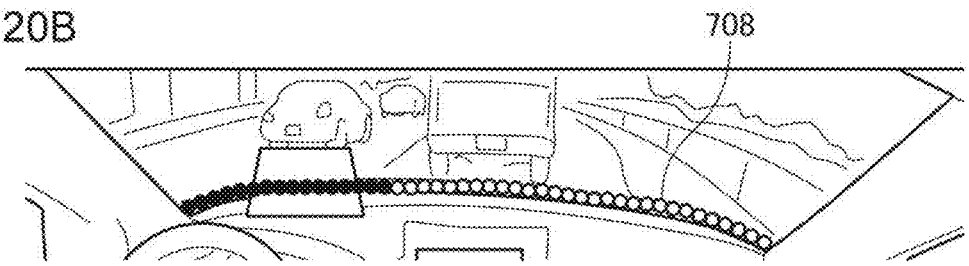

FIGS. 20A-20E show an outline of display on the LED display 708. FIG. 20A shows how the display controller 206 controls the display when the prediction error in the entire front area is smaller than a predetermined value. In this case, the prediction error is small, but the absence of the object 410 tends to make the driver relax his or her attention. Therefore, the driver is prompted to focus on the leading vehicle by lighting the central part of the LED display 708. FIG. 20B shows how the display controller 206 controls the display when the prediction error in the front left area is smaller than a predetermined value. In this case, the absence of the object 410 makes the prediction error uneven and tends to make the driver's attention unbalanced. Therefore, the driver is prompted to focus on the front left area by lighting the left part of the LED display 708.

Figure 20C:
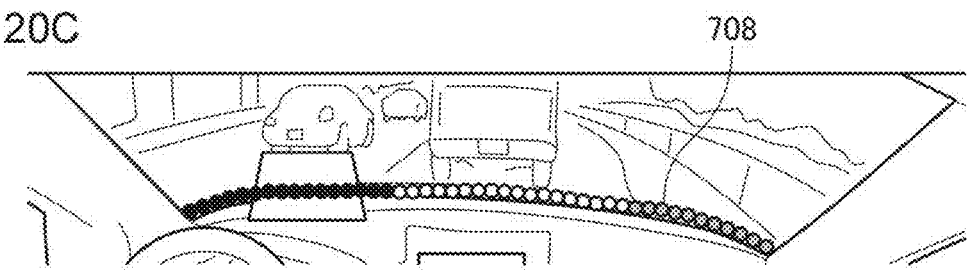
Figure 20D:
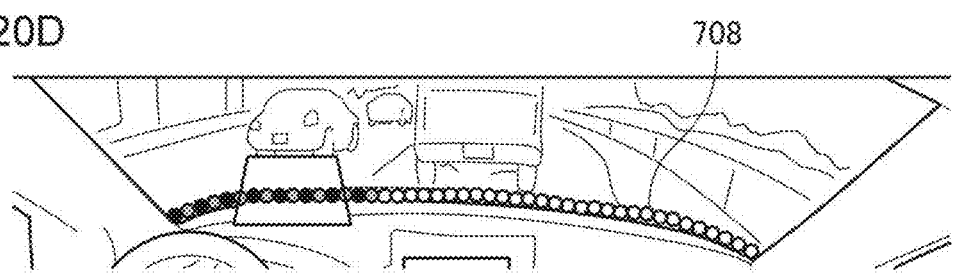
Figure 20E:
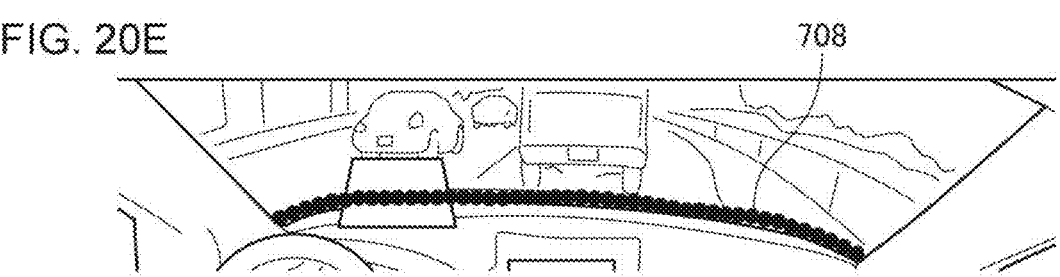

FIG. 20C shows how the display controller 260 controls the display when the prediction error in the front right area is smaller than the prediction error in the front left area and the prediction error in the front left area is smaller than a predetermined value. In this case, the left part and the right part of the LED display 708 are lighted in different colors. FIG. 20D shows how the display controller 260 controls the display when the prediction error in the front left area is larger than a predetermined value. In this case, the driver's perception cannot catch up in the absence of the object 410. Therefore, the driver is prompted to focus on the front left area by lighting the left part of the LED display 708. FIG. 20E shows how the display controller 260 controls the display when the prediction error in the entire front area is larger than a predetermined value. In this case, the load on the driver is excessively large (the requirement for the driver is excessively high). Therefore, the driver is prompted to decelerate or slow down by lighting the entire LED display 708.

Figure 21A:
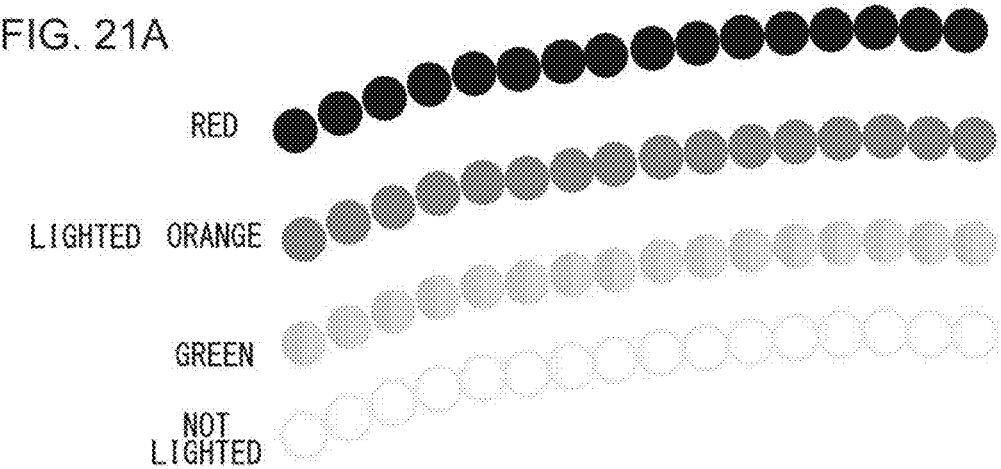
FIGS. 21A-21D show the detail of display on the LED display according to embodiment 7.
Figure 21B:
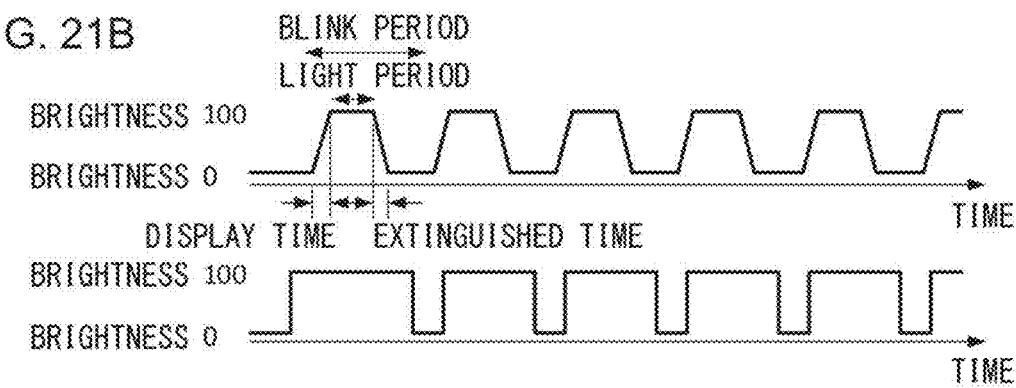

FIGS. 21A-21D show the detail of display on the LED display 708. FIG. 21A shows colors in which the LED display 708 is lighted. The LED display 708 can be lighted in any of red, orange, and green. The LED display 708 may not be lighted. FIG. 21B shows control for causing the LED display 708 to blink. The LED display 708 blinks by repeating the lighted state with a brightness "100" and the extinguished state with a brightness "0". The percentage of the light period occupying the blink period is defined as a duty ratio. The duty ratio can be changed as shown in the upper and lower parts.

Figure 21C:
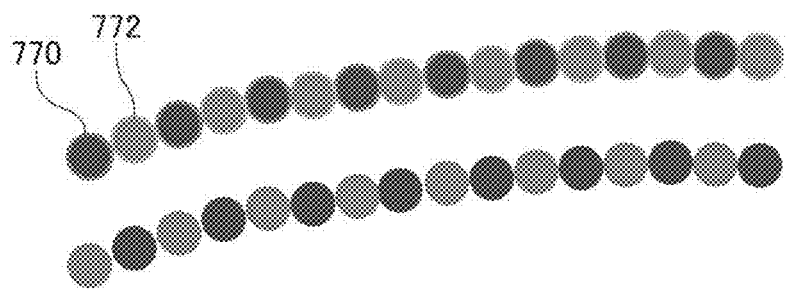
Figure 21D:
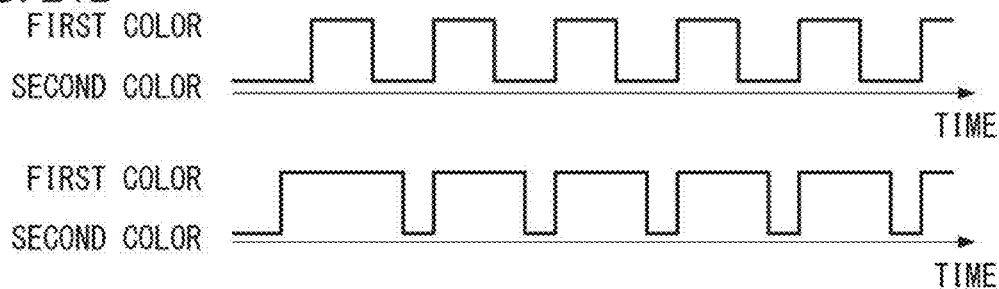

FIG. 21C shows a configuration in which a first color 770 and a second color 772 are alternately arranged in the LED display 708. The first color 770 and the second color 772 are mutually different colors. As shown in the upper part and the lower part, the positions of the first color 770 and the second color 772 may be switched. FIG. 21D shows control for changing the color of the LED display 708. The LED display 708 is lighted, repeating the first color 770 and the second color 772. The lighting time of the first color 770 and the lighting time of the second color 772 may be equal.

FIGS. 22A-22E show an outline of display on the HUD 702. FIG. 22A shows how the display controller 206 controls the display when the prediction error in the entire front area is smaller than a predetermined value. In this case, the prediction error is small, but the absence of the object 410 tends to make the driver relax his or her attention. Therefore, the driver is prompted to focus on the leading vehicle by lighting the first potential information presenting image 760a in the left part of the HUD 702 and the second potential information presenting image 760b in the right part. Further, the potential information presenting image 760 in the lower part of the HUD 702 may be lighted. FIG. 22B shows how the display controller 206 controls the display when the prediction error in the front left area is smaller than a predetermined value. In this case, the absence of the object 410 makes the prediction error uneven and tends to make the driver's attention unbalanced. Therefore, the driver is prompted to focus on the front left area by lighting the potential information presenting image in the left part of the HUD 702. The potential information presenting image 760 may be vertically elongated or horizontally elongated.

FIG. 22C shows how the display controller 260 controls the display when the prediction error in the front right area is smaller than the prediction error in the front left area and the prediction error in the front left area is smaller than a predetermined value. In this case, the first potential information presenting image 760a in the left part of the HUD 702 and the second potential information presenting image 760b in the right part are lighted in different colors. The potential information presenting image 760 may be vertically elongated or horizontally elongated. FIG. 22D shows how the display controller 260 controls the display when the prediction error in the front left area is larger than a predetermined value. In this case, the driver's perception cannot catch up in the absence of the object 410. Therefore, the driver is prompted to focus on the front left area by lighting the potential information presenting image 760 in the left part of the HUD 702 in the first color 770 and the second color 772. The potential information presenting image 760 may be vertically elongated or horizontally elongated. FIG. 22E shows how the display controller 260 controls the display when the prediction error in the entire front area is larger than a predetermined value. In this case, the load on the driver is excessively large (the requirement for the driver is excessively high). Therefore, the driver is prompted to decelerate or slow down by lighting the potential information presenting image 760 having a frame shape along the edge of the HUD 702.

Figure 23A:
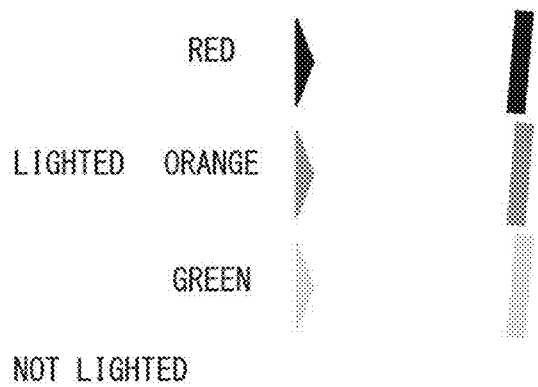
FIGS. 23A-23D show the detail of display on the HUD according to embodiment 7.
Figure 23B:
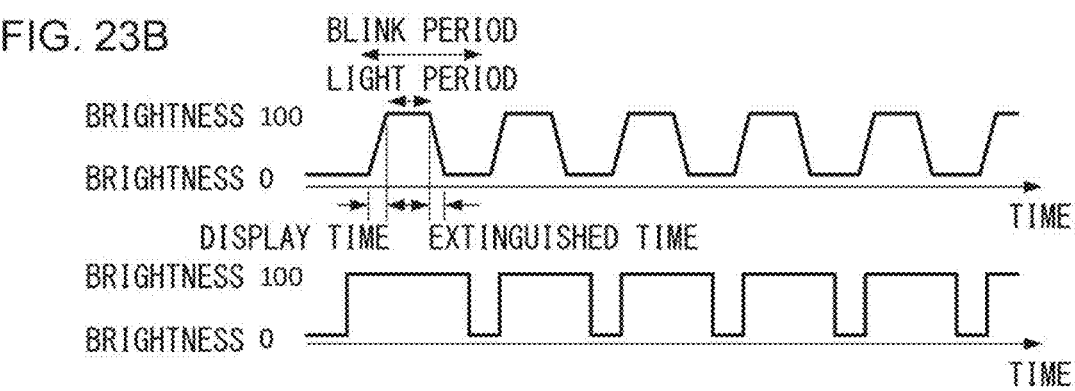

FIGS. 23A-23D show the detail of display on the HUD 702. FIG. 23A shows colors in which the potential information presenting image 760 is lighted in the HUD 702. The HUD 702 can be lighted in any of red, orange, and green. The HUD 702 may not be lighted. FIG. 23B shows control for causing the potential information presenting image 760 to blink in the HUD 702. The HUD 702 blinks by repeating the lighted state with a brightness "100" and the extinguished state with a brightness "0". The percentage of the light period occupying the blink period is defined as a duty ratio. The duty ratio can be changed as shown in the upper and lower parts.

Figure 23C:
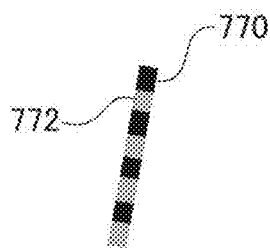
Figure 23D:
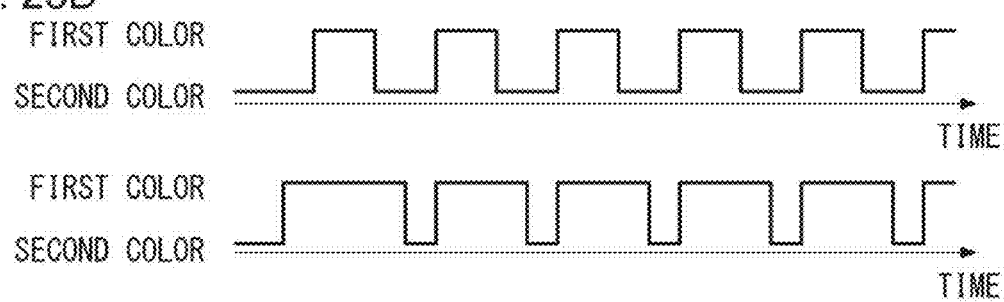

FIG. 23C shows a configuration in which a first color 770 and a second color 772 are alternately arranged in the potential information presenting image 760 on the HUD 702. The first color 770 and the second color 772 are mutually different colors. As shown in the upper part and the lower part, the positions of the first color 770 and the second color 772 may be switched. FIG. 23D shows control for changing the color of the potential information presenting image 760 on the HUD 702. The HUD 702 is lighted, repeating the first color 770 and the second color 772. The lighting time of the first color 770 and the lighting time of the second color 772 may be equal.

Figure 24A:
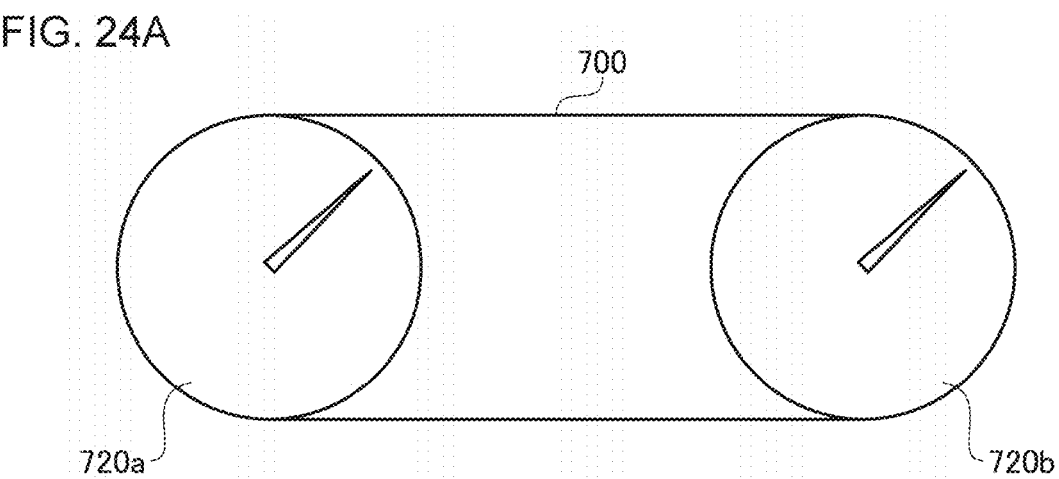
FIGS. 24A-24B show a configuration of the meter display according to embodiment 7.
Figure 24B:
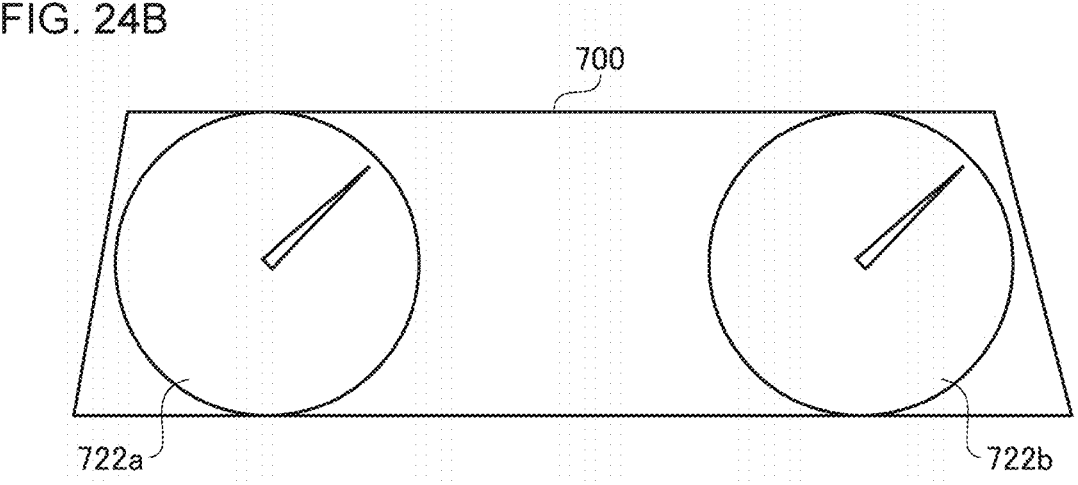

FIGS. 24A-24B show a configuration of the meter display 700. FIG. 24A show that the meter display 700, which is a CIT, is provided between a first meter 720a and a second meter 720b arranged horizontally. FIG. 24B shows that a first meter image 722a and a second meter image 722b are displayed on the meter display 700.

Figure 25A:
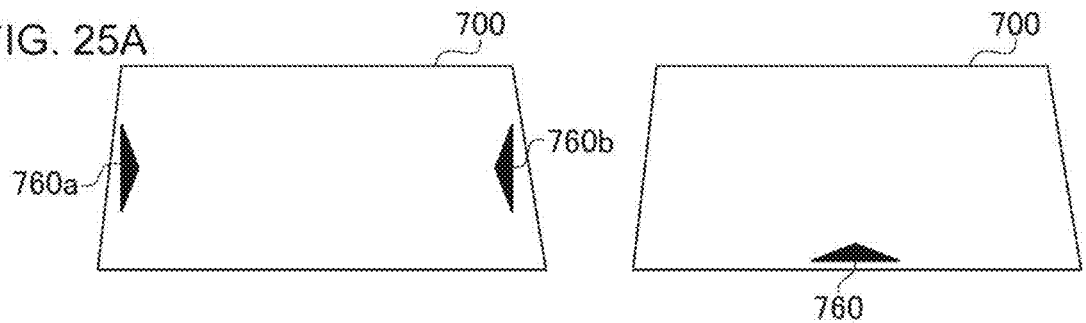
FIGS. 25A-25E show an outline of display on the meter display according to embodiment 7.
Figure 25B:
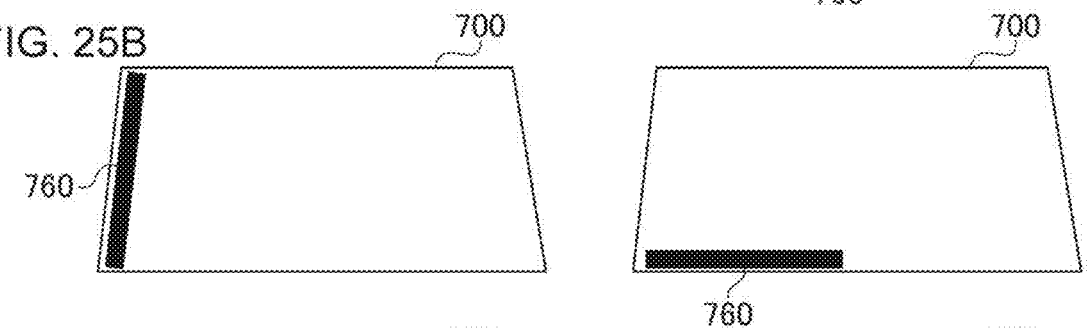

FIGS. 25A-25E show an outline of display on the meter display 700. FIG. 25A shows how the display controller 206 controls the display when the prediction error in the entire front area is smaller than a predetermined value. In this case, the prediction error is small, but the absence of the object 410 tends to make the driver relax his or her attention. Therefore, the driver is prompted to focus on the leading vehicle by lighting the first potential information presenting image 760a in the left part of the meter display 700 and the second potential information presenting image 760b in the right part. Further, the potential information presenting image 760 in the lower part of the meter display 700 may be lighted. FIG. 25B shows how the display controller 206 controls the display when the prediction error in the front left area is smaller than a predetermined value. In this case, the absence of the object 410 makes the prediction error uneven and tends to make the driver's attention unbalanced. Therefore, the driver is prompted to focus on the front left area by lighting the potential information presenting image 760 in the left part of the meter display 700. The potential information presenting image 760 may be vertically elongated or horizontally elongated.

Figure 25C:
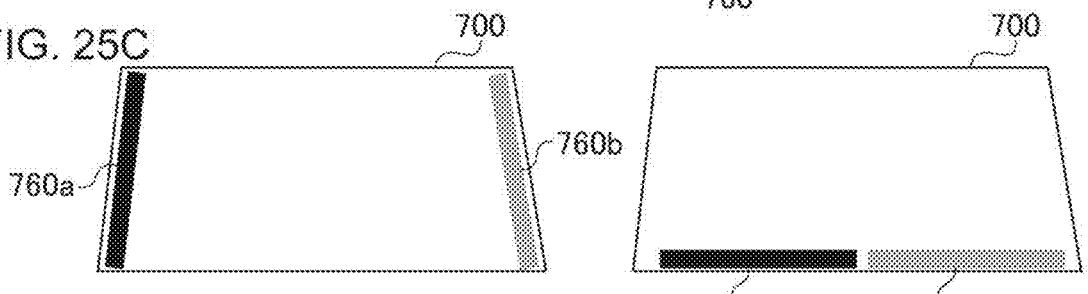
Figure 25D:
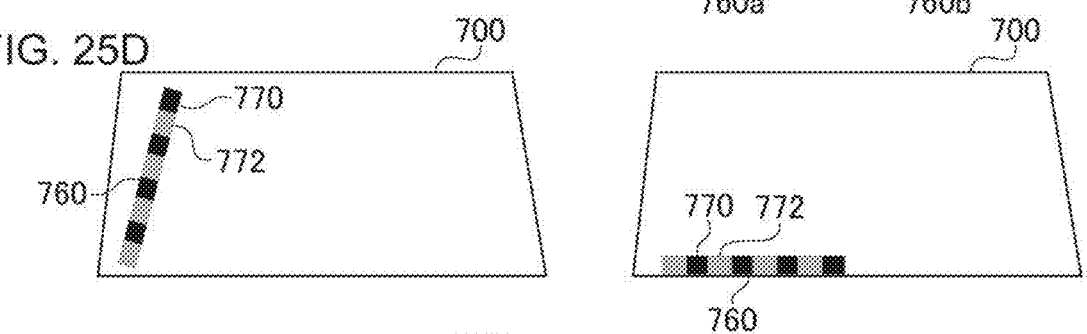
Figure 25E:
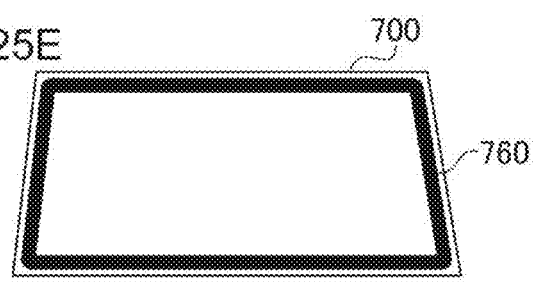

FIG. 25C shows how the display controller 260 controls the display when the prediction error in the front right area is smaller than the prediction error in the front left area and the prediction error in the front left area is smaller than a predetermined value. In this case, the first potential information presenting image 760a in the left part of the meter display 700 and the second potential information presenting image 760b in the right part are lighted in different colors. The potential information presenting image 760 may be vertically elongated or horizontally elongated. FIG. 25D shows how the display controller 260 controls the display when the prediction error in the front left area is larger than a predetermined value. In this case, the driver's perception cannot catch up in the absence of the object 410. Therefore, the driver is prompted to focus on the front left area by lighting the potential information presenting image 760 in the left part of the meter display 700 in the first color 770 and the second color 772. The potential information presenting image 760 may be vertically elongated or horizontally elongated. FIG. 25E shows how the display controller 260 controls the display when the prediction error in the entire front area is larger than a predetermined value. In this case, the load on the driver is excessively large (the requirement for the driver is excessively high). Therefore, the driver is prompted to decelerate or slow down by lighting the potential information presenting image 760 having a frame shape along the edge of the meter display 700.

FIGS. 26A-26E show an outline of display on the pillar display 710. FIG. 26A shows how the display controller 206 controls the display when the prediction error in the entire front area is smaller than a predetermined value. In this case, the prediction error is small, but the absence of the object 410 tends to make the driver relax his or her attention. Therefore, the driver is prompted to focus on the leading vehicle by lighting the first potential information presenting image 760a on the first pillar display 710a and lighting the second potential information presenting image 760b on the second pillar display 710b. FIG. 26B shows how the display controller 206 controls the display when the prediction error in the front left area is smaller than a predetermined value. In this case, the absence of the object 410 makes the prediction error uneven and tends to make the driver's attention unbalanced. Therefore, the driver is prompted to focus on the front left area by lighting the potential information presenting image 760 on the first pillar display 710a. In the second pillar display 710b, the potential information presenting image 760 is not lighted.

FIG. 26C shows how the display controller 260 controls the display when the prediction error in the front right area is smaller than the prediction error in the front left area and the prediction error in the front left area is smaller than a predetermined value. In this case, the first potential information presenting image 760a on the first pillar display 710a and the second potential information presenting image 760b on the second pillar display 710b are lighted in different colors. FIG. 26D shows how the display controller 260 controls the display when the prediction error in the front left area is larger than a predetermined value. In this case, the driver's perception cannot catch up in the absence of the object 410. Therefore, the driver is prompted to focus on the front left area by lighting the potential information presenting image 760 on the first pillar display 710a in the first color 770 and the second color 772. FIG. 26E shows how the display controller 260 controls the display when the prediction error in the entire front area is larger than a predetermined value. In this case, the load on the driver is excessively large (the requirement for the driver is excessively high). Therefore, the driver is prompted to decelerate or slow down by lighting the first potential information presenting image 760a on the first pillar display 710a and lighting the second potential information presenting image 760b on the second pillar display 710b.

Figure 27A:
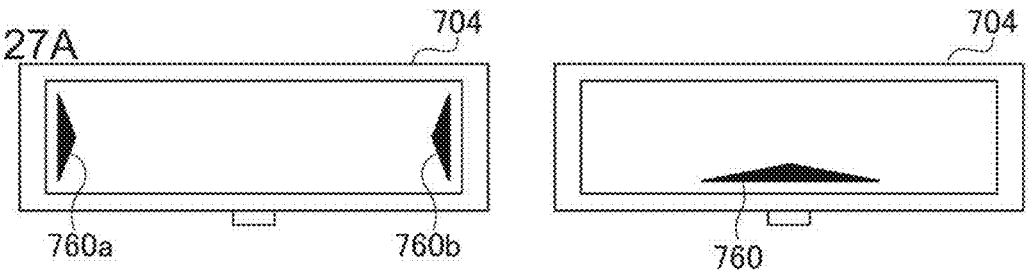
FIGS. 27A-27E show an outline of display on the mirror display according to embodiment 7.
Figure 27B:
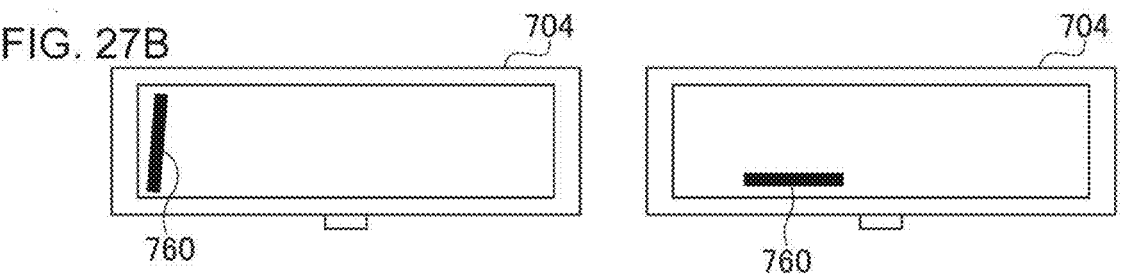

FIGS. 27A-27E show an outline of display on the mirror display 704. FIG. 27A shows how the display controller 206 controls the display when the prediction error in the entire front area is smaller than a predetermined value. In this case, the prediction error is small, but the absence of the object 410 tends to make the driver relax his or her attention. Therefore, the driver is prompted to focus on the leading vehicle by lighting the first potential information presenting image 760a in the left part of the mirror display 740 and the second potential information presenting image 760b in the right part. Further, the potential information presenting image 760 in the lower part of the mirror display 704 may be lighted. FIG. 27B shows how the display controller 206 controls the display when the prediction error in the front left area is smaller than a predetermined value. In this case, the absence of the object 410 makes the prediction error uneven and tends to make the driver's attention unbalanced. Therefore, the driver is prompted to focus on the front left area by lighting the potential information presenting image 760 in the left part of the mirror display 704. The potential information presenting image 760 may be vertically elongated or horizontally elongated.

Figure 27C:
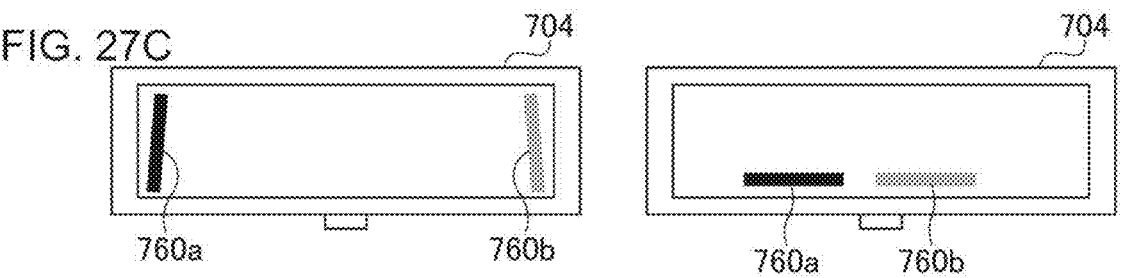
Figure 27D:
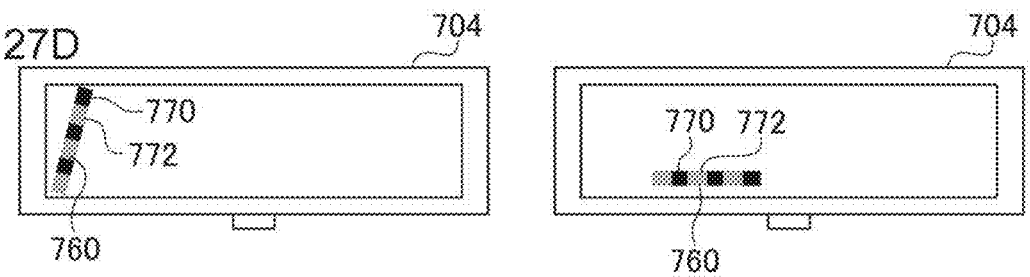
Figure 27E:

FIG. 27C shows how the display controller 260 controls the display when the prediction error in the front right area is smaller than the prediction error in the front left area and the prediction error in the front left area is smaller than a predetermined value. In this case, the first potential information presenting image 760a in the left part of the mirror display 704 and the second potential information presenting image 760b in the right part are lighted in different colors. The potential information presenting image 760 may be vertically elongated or horizontally elongated. FIG. 27D shows how the display controller 260 controls the display when the prediction error in the front left area is larger than a predetermined value. In this case, the driver's perception cannot catch up in the absence of the object 410. Therefore, the driver is prompted to focus on the front left area by lighting the potential information presenting image 760 in the left part of the mirror display 704 in the first color 770 and the second color 772. The potential information presenting image 760 may be vertically elongated or horizontally elongated. FIG. 27E shows how the display controller 260 controls the display when the prediction error in the entire front area is larger than a predetermined value. In this case, the load on the driver is excessively large (the requirement for the driver is excessively high). Therefore, the driver is prompted to decelerate or slow down by lighting the potential information presenting image 760 having a frame shape along the edge of the mirror display 704.

According to the embodiment, the mode of display of the information presenting image is changed when the prediction error changes so that it is possible to properly provide information for communicating a potential risk associated with a scene or an object that is difficult for human beings to perceive.

The embodiments according to the present disclosure have been described in detail with reference to the drawings, but the functions of the devices and processing units described above can be implemented by a computer program. A computer that implements the functions described above by means of a program is provided with: an input device such as a keyboard, mouse, and touch pad; an output device such as a display and speaker; a central processing unit (CPU); a storage device such as a ROM, RAM, hard disk device, and solid state drive (SSD); a reader that reads information from a recording medium such as a digital versatile disk read only memory (DVD-ROM) and USB memory; a network card that performs communication via a network. The components are connected by a bus.

The reader reads the program from a recording medium storing the program and causes the storage device to store the read program. Alternatively, the network card may communicate with a server device connected to the network and cause the storage device to store the program downloaded from the server device and implementing the functions of the devices. The CPU copies the program stored in the storage device to the RAM, and the functions of the above devices are implemented by sequentially reading commands included in the program from the RAM and executing the commands.

A display control device according to an embodiment of the present disclosure includes: an input unit that receives a first image that captures a scene in front of a vehicle or a scene in front of a user on board a vehicle at a first point of time; a generator that generates a third image showing a result of prediction of the scene in front at the first point of time, based on a second image that captures the scene in front at a second point of time preceding the first point of time; and a display controller that controls information presentation based on a result of comparison between the first image and the third image using a predetermined criterion.

According to this embodiment, the information presenting image is displayed based on the result of comparison between the first image and the third image so that it is possible to alert the user, while also reducing the annoyance from the display.

The predetermined criterion may be:
- "the difference between the first image and the third image is larger than a predetermined threshold value (e.g., the first threshold value)";
- "the difference between the first image and the third image is smaller than a predetermined threshold value (e.g., the second threshold value)";
- "a state in which the difference between the first image and the third image is larger (or smaller) than a predetermined threshold value (e.g., the first threshold value) continues for a predetermined period of time or longer";
- "when the distribution of difference values between pixels of the first image and the third image is a particular distribution"; or
- "the amount of variation of the difference obtained by comparing a series of first images and a series of third images in a unit time becomes larger than a third threshold value (or becomes smaller than the third threshold value)", etc.

The display control device further includes: a comparator that compares the first image and the third image by using the predetermined criterion. In this case, the first image and the third image are compared by using a predetermined criterion so that a difference or absence thereof can be identified.

The predetermined criterion is whether a difference between the first image and the third image is larger than a first threshold value, the comparator identifies a first area in which the difference between the first image and the third image is larger than the first threshold value and which includes an imaging area of a first object, and the information presentation is an image that alerts of the first area or the first object. In this case, the information presenting image showing the first area in which the difference between the first image and the third image is larger than the threshold value and in which the first image includes the first object is displayed so that it is possible to alert the user, while also reducing the annoyance from the display.

The display controller may change a display mode of the information presentation in accordance with a magnitude of the difference between the first image and the third image. In this case, the mode of display of the information presenting image is changed in accordance with the magnitude of the difference so that it is possible to communicate the magnitude of the prediction error, i.e., a potential risk associated with a scene or an object that is difficult for human beings to perceive.

The display controller causes the information presentation to be displayed such that the information presentation is superimposed on the first area identified by the comparator. In this case, the information presenting image is displayed to be superimposed on the identified first area so that the object for which the user is alerted by the information presenting image can be made easily recognizable.

The display controller causes the information presentation to be displayed in a partial area, of a plurality of partial areas derived from dividing a display-enabled area, that includes the first area identified by the comparator. In this case, the information presenting image is displayed in the partial area that includes the identified first area so that the process can be simplified.

The first image, the second image, and the third image are images of a scene in front of the vehicle, the input unit receives a fourth image that captures a scene in a vehicle interior of the vehicle at a first point of time, the generator generates a sixth image that predicts a scene in the vehicle interior at the first point of time from a fifth image that captures a scene in the vehicle interior at the second point of time, the comparator identifies whether there is a second area in which a difference between the fourth image and the sixth image is larger than a second threshold value and which includes a second object, and the display controller changes a display mode of the information presentation depending on whether the second area is identified. In this case, the mode of display of the information presenting image is changed depending on whether there is a second area in which the difference between the fourth image and the sixth image is larger than a second threshold value and in which the fourth image includes the second object so that the user can be alerted.

The second threshold value could be a value different from the first threshold value. The second threshold value may be defined to adapt to the first threshold value. Further, the second threshold value may be defined according to the first threshold value and a predetermined calculation formula.

The display control device may further include: a comparator that compares the first image and the third image. The display controller may receive a result of sensing a spacing between the vehicle and the object and cause the information presentation to be displayed based on the spacing and a difference between the first image and the third image compared by the comparator, and the display controller may change a display mode of the information presentation when the spacing or the difference between the first image and the third image changes. In this case, the mode of display of the information presenting image is changed when the difference between the first image and the third image changes so that it is possible to communicate a potential risk associated with a scene or an object that is difficult for human beings to perceive.

The display control device may further include: a comparator that compares the first image and the third image. The display controller may cause a potential information presenting image for communicating a potential risk associated with a scene or an object that is difficult for human beings to perceive to be displayed, based on a difference between the first image and the third image compared by the comparator, the display controller may cause the potential information presenting image to be displayed in a first display mode when a result of sensing an object is received and cause the potential information presenting image to be displayed in a second display mode when a result of sensing an object is not received, and a manifest information presenting image for communicating a manifest danger may be displayed when a result of sensing an object is received, and the first display mode and the second display mode may be different. In this case, the patent information presenting image and the potential information presenting image are displayed on different display devices so that interference between the manifest information presenting image and the potential information presenting image can be suppressed.

The display control device may further include: a comparator that compares the first image and the third image. The display controller may cause a potential information presenting image for communicating a potential risk associated with a scene or an object that is difficult for human beings to perceive to be displayed on a first display device, based on a difference between the first image and the third image compared by the comparator, the first display device may be different from a second display device that displays a manifest information presenting image for communicating a manifest danger when an object is sensed. In this case, the patent information presenting image and the potential information presenting image are displayed on different display devices so that interference between the manifest information presenting image and the potential information presenting image can be suppressed.

The display control device may further include: a comparator that compares the first image and the third image. The display controller may cause an information presenting image to be displayed based on a difference between the first image and the third image compared by the comparator, and when the difference between the first image and the third image changes, the display controller may change a display mode of the information presenting image. In this case, the mode of display of the information presenting image is changed when the difference between the first image and the third image changes so that it is possible to properly communicate a potential risk associated with a scene or an object that is difficult for human beings to perceive.

Another embodiment of the present disclosure relates to a display system. The display system includes: an imaging device; and a display control device connected to the imaging device. The display control device includes: an input unit that receives a first image that captures a scene in front of a vehicle or a scene in front of a user on board a vehicle at a first point of time; a generator that generates a third image showing a result of prediction of the scene in front at the first point of time, based on a second image that captures the scene in front at a second point of time preceding the first point of time; and a display controller that controls information presentation based on a result of comparison between the first image and the third image using a predetermined criterion.

Still another embodiment of the present disclosure relates to a display control method. The method includes: receiving a first image that captures a scene in front of a vehicle or a scene in front of a user on board a vehicle at a first point of time; generating a third image showing a result of prediction of the scene in front at the first point of time, based on a second image that captures the scene in front at a second point of time preceding the first point of time; and controlling information presentation based on a result of comparison between the first image and the third image using a predetermined criterion.

Described above is an explanation based on exemplary embodiments. The embodiments are intended to be illustrative only and it will be understood by those skilled in the art that various modifications to constituting elements and processes could be developed and that such modifications are also within the scope of the present disclosure.

It the embodiments, the information presenting image has been mainly described as being displayed such that it is superimposed on the foreground by way of example. However, the present disclosure is not limited to the embodiments. For example, the dashboard 10 in the vehicle 1000 may be fitted with a plurality of LEDs in a single horizontal line. In this case, the LED near the location of occurrence of a prediction error may be lighted (in place of or in addition to displaying the information presenting image). Concurrently, a predetermined image (an information presenting image, etc.) may be displayed in the center information display (CID). According to this variation, the flexibility of configuration can be improved.

In the embodiments, the example of controlling the mode of display of the information presenting image is mainly described. However, the present disclosure is not limited to the embodiments. For example, the brightness, hue, etc. of the illumination in the vehicle interior may be controlled to alert the driver. According to this variation, the flexibility of configuration can be improved.

The embodiments may be configured for provision of least-priority information or provision of least critical or least urgent information in the prioritization of alerts and warnings recommended as discussed below in the international standards or in the integration of alerts and warning according to criticality and urgency.

Reference material 1: ISO/TS 1695 Road vehicles—Ergonomic aspects of transport information and control systems (TICS)-Procedures for determining priority of on-board messages presented to drivers Reference material 1 says "it is necessary to determine the priority of information in consideration of criticality and urgency and consider the presentation method and timing so that the higher the priority, the faster and the more firmly the information is communicated to the driver". Presentation according to the embodiments to communicate a potential risk associated with a scene or an object that is difficult for human beings to perceive is defined as presentation having lower priority and urgency than alerts and warnings in advanced driver-assistance systems.

Reference material 2: ISO/TR 12204:2012 Road vehicles—Ergonomic aspects of transport information and control systems—Introduction to integrating safety critical and time critical warning signals Reference material 2 says "in presenting multiple alerts, it is necessary to be considerate of the presentation method so that competition between alerts (inability to understand multiple alerts due to masing of an alert or confusion of the driver due to simultaneous presentation) does not occur".

Competition of alerts may occur:

1) when the same presentation means (visual, auditory, haptic, etc.) is used in multiple alerts;

2) when multiple visual alerts are presented at spatially proximate locations;

3) when multiple alerts having similar characteristics (in the case of auditory alerts, frequency; in the case of visual alerts, display, icon shape, etc.) are presented; and 4) a frequent alert and a less frequent alert (less frequent information may be misunderstood as frequent information).

Approaches to avoid a competition to address a case of competition between presentation to communicate a potential risk associated with a scene or an object difficult for human beings to perceive competes and an alert may be:

a) when the presentation is originated later in time, change a threshold value or a parameter that determines the timing of presentation;

b) when the alert has a higher priority, present information for visual perception, which is characterized by slower response time than in the case of auditory or haptic information presentation; and c) change the presentation mode to let it be understood that that two or more alerts and presentation to communicate a potential risk associated with a scene or an object difficult for human beings to perceive are different.

For example, parameter(s) may be changed not to interfere with the alert and/or to increase the distinguishability. Parameters include: pitch, frequency, waveform, sound volume, etc. in the case of auditory perception; i) position, flashing rate, and ii) design, color, size, etc. of symbols and icons in the case of visual perception; and amplitude, frequency, waveform, etc. in the case of tactile perception.

d) even when the target of an alert and the information presentation to communicate a potential risk associated with a scene or an object difficult for human beings to perceive are different, a common presentation may be used provided that the directions of occurrence are identical.

The content in potential information presentation according to the embodiments may be the display to strengthen the attention, display to distribute the attention appropriately, or display to prompt for deceleration. The medium of potential information presentation according to the embodiments may be visual perception, auditory perception, tactile perception, olfactory perception, or a combination thereof. With regard to olfactory perception, aroma having relaxing effect may be diffused when a large prediction error occurs, and aroma having alerting influence may be diffused when a condition of small prediction error continues. An alert may be displayed in the central area of vision or output from a front speaker. An alert may be displayed in the peripheral visual field or output from left and right speakers. An alert may be displayed outside the peripheral visual field or displayed in the whole field. Further, the potential information presentation may be displayed continuously or sounded continuously. The potential information presentation may be displayed only once or sounded only for a moment. The potential information presentation may be displayed multiple times, may blink, or may be extinguished by a trigger. The frequency of and number of items of potential information presentation may be controlled. The display mode encompasses text, icon, graphics, light emission, contrast, still image, moving images, and computer graphics (CG). In the display mode, the shape such as height, length, and area or the color, hue, brightness, contrast, translucency (transmitting display), or transparency (non-transmitting display) may be controlled. According to this variation, the flexibility of configuration can be improved.

Figure 28A:
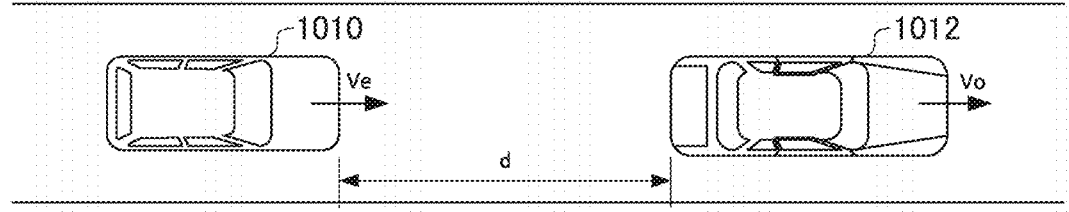
FIGS. 28A-28C illustrate results of sensing a spacing between the vehicle and the object.
Figure 28B:
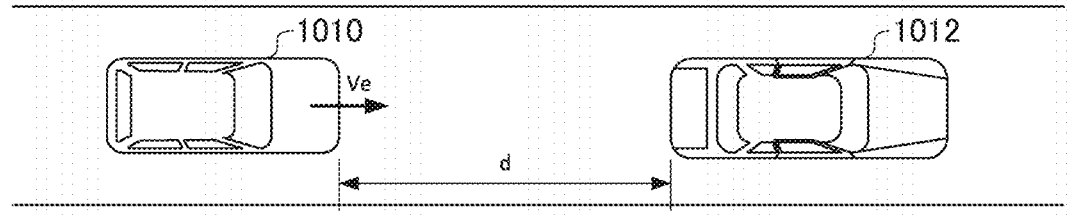
Figure 28C:
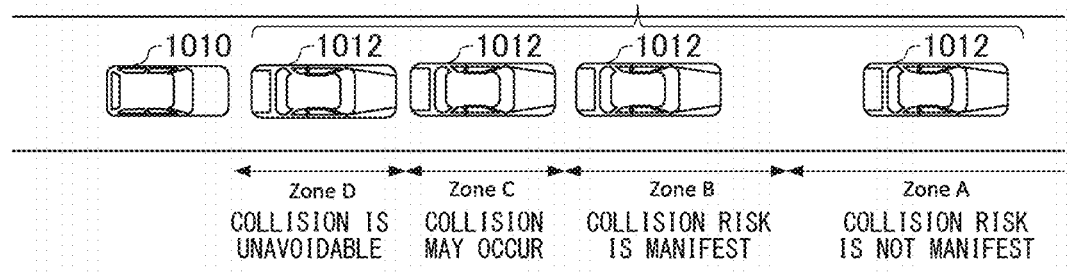

Instead of TTC in the embodiments, THW or risk perception may be used. FIGS. 28A-28C illustrate results of sensing a spacing between the vehicle 1000 and the object 410. In this figures, the vehicle 1000 is shown as a driver's vehicle 1010, and the object 410 is shown as a further vehicle (person) 1012. FIG. 28A shows an outline of TTC, FIG. 28B shows an outline of THW, and FIG. 28C shows an outline of risk perception. Reference material 3: Kondoh, Yamamura, Kitazaki, Kuge, Boer, "Identification of Visual Cues and Quantification of Drivers' Perception of Proximity Risk to the Lead vehicle in Car-Following situations", Journal of Mechanical Systems for Transportation and Logistics, Vol. 1, No. 2, pp. 170-180, 2008. According to reference material 3, the driver's subjective risk indices other than TTC include time headway (THW) and risk perception, which is represented by a sum of the reciprocal of TTC and the reciprocal of THW. When a collision cannot be avoided or when a collision is likely, TTC may be used. When a collision risk is manifest or when a collision risk is not manifest, risk perception or THW may be used. According to this variation, the flexibility of configuration can be improved.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2019-235908, filed on Dec. 26, 2019, the entire contents of which are incorporated herein by reference.

What is claimed is:

1. A display control device, comprising:
an input that receives a first image that captures a front scene, one of in front of a vehicle or in front of a user on board the vehicle, at a first point of time;
a sensor that receives a plurality of images from the input, detects an object included in the first image by subjecting the first image to an image recognition process, and sets an object placement area that encircles the object thus detected in the first image;
a processor that:
generates a third image showing a result of prediction of the front scene at the first point of time, based on a second image that captures the front scene at a second point of time preceding the first point of time; and
compares the first image and the third image by using a predetermined criterion; and
a display controller that controls information presentation based on a result of comparison between the first image and the third image using the predetermined criterion, wherein
the predetermined criterion is whether there is a difference area; in which a difference between the first image and the third image is larger than a first threshold value; and which includes the object placement area,
the processor identifies the difference area in which the difference between the first image and the third image is larger than the first threshold value, compares position information on the difference area with position information on the object placement area of the object included in the first image, and identifies an overlapping area in which the difference area and the object placement area overlap, and
the information presentation is an image that alerts of the overlapping area or the object.

2. The display control device according to claim 1, wherein
the display controller changes a display mode of the information presentation in accordance with a magnitude of the difference between the first image and the third image.

3. The display control device according to claim 1, wherein
the display controller causes the information presentation to be superimposed on the overlapping area identified by the processor.

4. The display control device according to claim 1, wherein
the display controller causes the information presentation to be displayed in a partial area, of a plurality of partial areas derived from dividing a display-enabled area, that includes the overlapping area identified by the processor.

5. The display control device according to claim 1, wherein
the first image, the second image, and the third image are images of the front scene,
the input receives a fourth image that captures an interior scene, in a vehicle interior of the vehicle, at the first point of time,
the processor generates a sixth image that predicts the interior scene in the vehicle interior at the first point of time from a fifth image that captures the interior scene at the second point of time, the processor identifies whether there is a second difference area in which a second difference between the fourth image and the sixth image is larger than a second threshold value and which includes a second object, and the display controller changes a display mode of the information presentation depending on whether the second difference area is identified.

6. The display control device according to claim 1, wherein the display controller receives a result of sensing a spacing between the vehicle and the object and causes the information presentation to be displayed based on the spacing and the difference between the first image and the third image, and the display controller changes a display mode of the information presentation when the spacing or the difference between the first image and the third image changes.

7. The display control device according to claim 1, wherein the display controller causes a potential information presenting image for communicating a potential risk associated with a scene or an object that is difficult for human beings to perceive to be displayed, based on the difference between the first image and the third image, the display controller causes the potential information presenting image to be displayed in a first display mode when a result of sensing an object is received and causes the potential information presenting image to be displayed in a second display mode when the result of sensing the object is not received, and a manifest information presenting image for communicating a manifest danger is displayed when the result of sensing the object is received, and the first display mode and the second display mode are different.

8. The display control device according to claim 1, wherein the display controller causes a potential information presenting image for communicating a potential risk associated with a scene or an object that is difficult for human beings to perceive to be displayed on a first display device, based on the difference between the first image and the third image, and the first display device is different from a second display device that displays a manifest information presenting image for communicating a manifest danger when the object is sensed.

9. The display control device according to claim 1, wherein, when the difference between the first image and the third image changes, the display controller changes a display mode of the information presentation.

10. A display system comprising:
an imaging device;
a sensor that receives a plurality of images from the imaging device, detects an object included in a first image of the plurality of images by subjecting the first image to an image recognition process, and sets an object placement area that encircles the object thus detected in the first image; and a display control device connected to the imaging device, wherein the display control device includes a processor that:
receives the first image that captures a front scene, one of in front of a vehicle or in front of a user on board the vehicle, at a first point of time;
generates a third image showing a result of prediction of the front scene at the first point of time, based on a second image that captures the front scene at a second point of time preceding the first point of time;
compares the first image and the third image by using a predetermined criterion; and
controls information presentation based on a result of comparison between the first image and the third image using the predetermined criterion, wherein the predetermined criterion is whether there is a difference area: in which a difference between the first image and the third image is larger than a first threshold value; and which includes the object placement area, the processor identifies the difference area in which the difference between the first image and the third image is larger than the first threshold value, compares position information on the difference area with position information on the object placement area of the object included in the first image, and identifies an overlapping area in which the difference area and the object placement area overlap, and the information presentation is an image that alerts of the overlapping area or the object.

11. A display control method, comprising:
receiving a first image that captures a front scene, one of in front of a vehicle or in front of a user on board the vehicle, at a first point of time;
receiving a plurality of images, detecting an object included in the first image by subjecting the first image to an image recognition process, and setting an object placement area that encircles the object thus detected in the first image;
generating a third image showing a result of prediction of the front scene at the first point of time, based on a second image that captures the front scene at a second point of time preceding the first point of time;
comparing the first image and the third image by using a predetermined criterion; and
controlling information presentation based on a result of comparison between the first image and the third image using the predetermined criterion, wherein the predetermined criterion is whether there is a difference area: in which a difference between the first image and the third image is larger than a first threshold value; and which includes the object placement area, the display control method identifies the difference area in which the difference between the first image and the third image is larger than the first threshold value, compares position information on the difference area with position information on the object placement area of the object included in the first image, and identifies an overlapping area in which the difference area and the object placement area overlap, and the information presentation is an image that alerts of the overlapping area or the object.

* * * * *